United States Patent
Seki

(10) Patent No.: US 9,088,338 B2
(45) Date of Patent: *Jul. 21, 2015

(54) WIRELESS COMMUNICATION SYSTEM AND WIRELESS COMMUNICATION METHOD

(71) Applicant: FUJITSU LIMITED, Kawasaki-shi, Kanagawa (JP)

(72) Inventor: Hiroyuki Seki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/865,742

(22) Filed: Apr. 18, 2013

(65) Prior Publication Data
US 2013/0242755 A1     Sep. 19, 2013

Related U.S. Application Data

(63) Continuation of application No. 12/648,561, filed on Dec. 29, 2009, now Pat. No. 8,565,330, which is a continuation of application No. 11/878,060, filed on Jul. 20, 2007, now Pat. No. 7,643,570, which is a continuation of application No. PCT/JP2005/001577, filed on Feb. 3, 2005.

(51) Int. Cl.
*H04J 1/16*     (2006.01)
*H04B 7/26*     (2006.01)
(Continued)

(52) U.S. Cl.
CPC ............ *H04B 7/2656* (2013.01); *H04L 1/0006* (2013.01); *H04L 1/0015* (2013.01);
(Continued)

(58) Field of Classification Search
None
See application file for complete search history.

(56) References Cited

U.S. PATENT DOCUMENTS 6,154,485 A   11/2000   Harrison
6,298,082 B1  10/2001   Harrison
(Continued)

FOREIGN PATENT DOCUMENTS

CN   1307431   8/2001
EP   1164711   12/2001
(Continued)

OTHER PUBLICATIONS

International Search Report issued for corresponding International Application No. PCT/JP2005/001577, mailed May 24, 2005.
(Continued)

*Primary Examiner* — Bunjob Jaroenchonwanit
(74) *Attorney, Agent, or Firm* — Myers Wolin, LLC

(57) ABSTRACT

A wireless communication system includes a pilot addition decision portion for deciding whether to add pilot symbols which are separate from the basic pilot symbols, to frames; a control symbol generation portion for generating control symbols including information related to additional pilot symbols; a frame assembly portion for assembling frames to which pilot symbols are added according to pilot addition decision; a transmission portion for transmitting the frames; and the reception device includes a control symbol demodulation portion for demodulating control symbols included in the received frames, and judges whether or not additional pilot symbols are included in the received frames based on the control symbol information; a data symbol demodulation portion for demodulating data symbols based on a propagation path estimation value which is estimated using the additional pilot symbols or using the additional and basic pilot symbols when the additional pilot symbols are included in the received frame.

24 Claims, 18 Drawing Sheets

(51) Int. Cl.
*H04L 5/00* (2006.01)
*H04L 1/00* (2006.01)
*H04L 1/16* (2006.01)

(52) U.S. Cl.
CPC ............ *H04L5/0048* (2013.01); *H04L 5/0051* (2013.01); *H04L 1/0026* (2013.01); *H04L 1/1671* (2013.01); *H04L 5/0007* (2013.01)

(56) References Cited

U.S. PATENT DOCUMENTS

| | | | | |
|---|---|---|---|---|
| 7,317,747 | B2 | 1/2008 | Miyazaki et al. | |
| 7,643,570 | B2 * | 1/2010 | Seki ............................. | 375/267 |
| 8,005,169 | B1 * | 8/2011 | Lee et al. ...................... | 375/340 |
| 8,064,328 | B2 * | 11/2011 | Ogawa et al. ................. | 370/208 |
| 8,243,863 | B2 * | 8/2012 | Kobayashi .................... | 375/349 |
| 8,311,138 | B2 * | 11/2012 | Imamura et al. ............. | 375/260 |
| 8,325,784 | B2 * | 12/2012 | Konishi et al. ................ | 375/146 |
| 8,514,815 | B2 * | 8/2013 | Gu et al. ....................... | 370/334 |
| 2002/0009128 | A1 * | 1/2002 | Ito ................................ | 375/147 |
| 2002/0191578 | A1 | 12/2002 | Bachl et al. | |
| 2003/0048753 | A1 | 3/2003 | Jalali | |
| 2004/0218559 | A1 * | 11/2004 | Kim et al. ..................... | 370/318 |
| 2004/0233838 | A1 * | 11/2004 | Sudo et al. .................... | 370/208 |
| 2004/0246924 | A1 | 12/2004 | Lundby et al. | |
| 2005/0014474 | A1 | 1/2005 | Jitsukawa et al. | |
| 2006/0139158 | A1 * | 6/2006 | Miller et al. .................. | 340/445 |
| 2010/0067590 | A1 * | 3/2010 | Walton et al. ................. | 375/260 |

FOREIGN PATENT DOCUMENTS

| | | |
|---|---|---|
| EP | 1494381 | 1/2005 |
| JP | 2002-528949 | 9/2002 |
| JP | 2003-032146 | 1/2003 |
| JP | 2003-514431 | 4/2003 |
| JP | 2003-536288 | 12/2003 |
| JP | 2005-502258 | 1/2005 |
| WO | 00/24133 | 4/2000 |
| WO | 01/35548 | 5/2001 |
| WO | 01/59950 | 8/2001 |
| WO | 03/021795 | 3/2003 |
| WO | 2004/056022 | 7/2004 |
| WO | 2004/098097 | 11/2004 |
| WO | 2004098097 | 11/2004 |

OTHER PUBLICATIONS

First Notification of Examination Opinion issued for corresponding Chinese Patent Application No. 200580047609.3, mailed Apr. 14, 2010, with partial English translation.
First Notification of Office Action issued for corresponding Chinese Patent Application No. 201010521951.5, issued Sep. 22, 2011, with English translation.
Notice of Reason(s) for Refusal issued for corresponding Japanese Patent Application No. 2010-061848, dispatched Jan. 5, 2011, with English translation.
Notification of Reason for Refusal issued for corresponding Japanese Patent Application No. 2010-061848, dispatched Aug. 2, 2011, with English translation.
Supplementary European search report issued for corresponding European Patent Application No. 05709670.3, dated Feb. 14, 2012.
Non-Final Office Action issued by the United States Patent and Trademark Office for corresponding U.S. Appl. No. 12/648,561, dated Oct. 5, 2011.
Final Office Action issued by the United States Patent and Trademark Office for corresponding U.S. Appl. No. 12/648,561, dated Mar. 26, 2012.
Non-Final Office Action issued by the United States Patent and Trademark Office for corresponding U.S. Appl. No. 12/648,561, dated Nov. 23, 2012.
Final Office Action issued by the United States Patent and Trademark Office for corresponding U.S. Appl. No. 12/648,561, electronically delivered on Jul. 17, 2013.

* cited by examiner

FIG. 4
(A)
PILOT ADDITION CRITERIA AND NUMBER ADDED
| RECEPTION SIR (dB) | 10 dB OR HIGHER | 5 TO 10 dB | 0 TO 5 dB | 0 TO −5 dB | −5 dB OR LOWER |
|---|---|---|---|---|---|
| NUMBER OF ADDITIONAL PILOTS | 0 | 1 | 2 | 3 | 4 |
(B)
PILOT ADDITION POSITIONS AND ORDER
| DOPPLER FREQUENCY | UNDER 100 Hz | 100 Hz OR HIGHER |
|---|---|---|
| ADDITIONAL PILOT POSITIONING | NO DISPERSED POSITIONING ADDITIONAL SYMBOL POSITIONS (1, 2, 3, 4) | DISPERSED POSITIONING ADDITIONAL SYMBOL POSITIONS (11, 6, 16, 1) |
FIG. 5
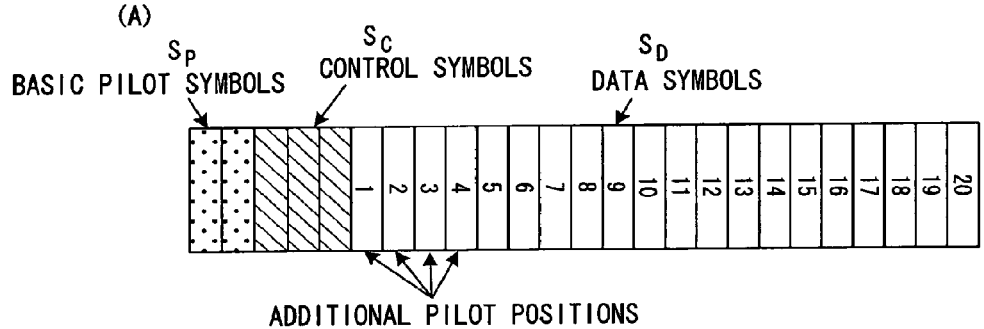
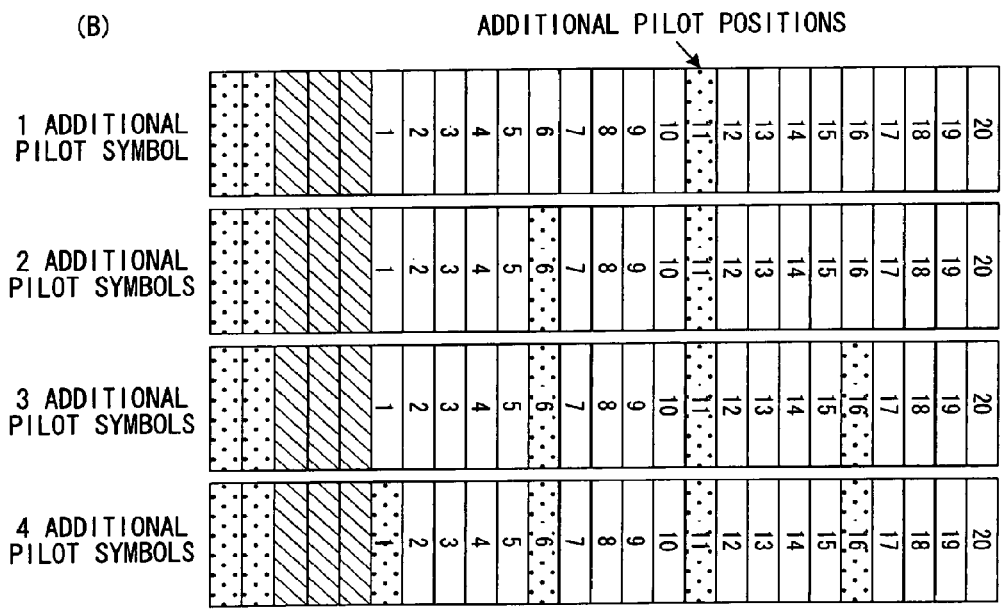

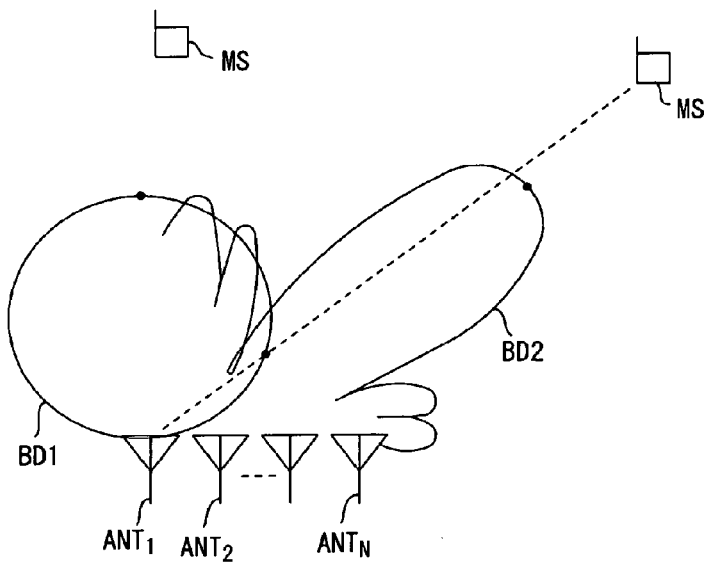

WIRELESS COMMUNICATION SYSTEM AND WIRELESS COMMUNICATION METHOD

CROSS-REFERENCE TO RELATED APPLICATIONS

The present application is a continuation of U.S. application Ser. No. 12/648,561 filed on Dec. 29, 2009, now pending, which is a continuation of U.S. application Ser. No. 11/878,060 filed on Jul. 20, 2007, now U.S. Pat. No. 7,643,570, which is a continuation of International Application No. PCT/JP2005/001577, filed Feb. 3, 2005, the contents of each are herein wholly incorporated by reference.

TECHNICAL FIELD

This invention relates to a wireless communication system and wireless communication method, and in particular relates to a wireless communication system and wireless communication method for transmitting and receiving frames comprising basic pilot symbols used for propagation path estimation, control symbols which convey control information necessary for data channel demodulation, and data symbols which convey information bits.

In order to increase the efficiency of data packet transmission in packet transmission for cellular mobile communication, adaptive modulation/demodulation control, adaptive spreading factor control, transmission power control, HARQ (Hybrid Automatic Repeat reQuest) control, scheduling control, and other types of adaptive wireless link control are employed. These types of control are performed using a control channel which is transmitted with the data channel; the transmitting station uses the control channel to notify the receiving station of the wireless link parameters being used in the data channel. For example, in the case of adaptive modulation/demodulation control, the control channel transmits the data channel modulation method (QPSK, 16QAM, or similar) and the coding rate. In the case of adaptive spreading factor control, the control channel transmits the spreading factor and spreading code, or the number of symbol repetitions and other information. In HARQ control, the control channel transmits the packet numbers transmitted over the data channel, the number of retransmissions, and other information. In the case of scheduling control, user IDs and other information is transmitted using the control channel.

FIG. 22 shows a frame configuration of the prior art, used in packet transmission for cellular mobile communication. One frame comprises basic pilot symbols $S_P$, control symbols $S_C$, and data symbols $S_D$. In a downlink in which a base station performs transmission, the basic pilot symbols $S_P$ may be regarded as common pilot signals. Basic pilot symbols $S_P$ are employed for propagation path estimation which is necessary for demodulation of control channel and data channel signals. In the data channel, adaptive wireless link control is employed to execute control of the modulation method, coding rate, spreading factor, transmission power, and similar. These control parameters are conveyed by means of control symbols $S_C$.

In adaptive wireless link control, control is executed to improve the data channel communication quality of a user experiencing poor communication quality at the edge of a cell, or to switch to a transmission method in which errors do not occur in an environment with poor communication quality, or similar. FIG. 23 is an example of a case in which transmission power control is performed for a user experiencing poor communication quality, at a cell edge or similar. As indicated in FIG. 23, in downlink communication control is executed so that the basic pilot symbol power is held constant, while the control symbol and data symbol transmission power is increased. In this way, in the example of FIG. 23, through transmission power control of the control channel and data channel, control is executed to improve communication quality; but adaptive control of basic pilot symbols is not performed. Hence ordinarily, in downlink communications, somewhat higher transmission power is allocated to the basic pilot symbols. However, at a cell edge there is the effect of interference from other cells, and so there is a tendency for channel estimation precision based on the pilot symbols to be degraded due to interference from other cells.

FIG. 24 is an example of a case in which adaptive spreading control is performed for a user at a cell edge or similar, experiencing poor communication quality. In this example, by increasing the number of repetitions of data symbols, the S/N of data channel is improved. Thus in the example of FIG. 24 also, control is executed to improve communication quality by controlling the number of symbol repetitions in the data channel, but adaptive control to improve the S/N of pilot symbols is not performed.

In this way, in conventional packet transmission methods the communication quality in the data channel between a user terminal at a cell edge or similar with poor communication quality and a base station is ensured through adaptive wireless link control, but there have existed no mechanisms for performing adaptive control of the pilot symbols, which greatly affect demodulation characteristics. Hence the estimation precision of channel estimation values used in data demodulation has not been improved, and so there has been the problem of a limit to improvement of the demodulation characteristics of the data channel.

In a first technology of the prior art, prescribed control symbols, such as for example the TFCI (Transport Format Combination Indicator) control symbols stipulated by 3GPP standards, are used as pilot symbols in addition to regular pilot symbols (see for example JP 2003-32146 A). By means of this first technology of the prior art, as a result of an increased number of symbols used as pilot symbols, the channel estimation precision can be improved.

As a second technology of the prior art, in a LAN format having a preamble portion and a payload portion, pilot symbols are inserted into the payload portion as well as into the preamble portion (see for example JP 2003-536288 A or WO01/059950 based upon PCT/US01/03778).

However, in the first technology of the prior art, the insertion of additional pilot symbols is not performed adaptively. And in the first technology of the prior art, the properties particular to the 3GPP standard are utilized, so that general application to channel estimation for wireless communication is not possible.

The second technology of the prior art is not a method of adaptive insertion of additional pilot symbols, but of always inserting pilot symbols into the preamble portion and into the payload portion, so that there is the problem that the number of pilot symbols increases and transmission efficiency is reduced.

SUMMARY OF THE INVENTION

In light of the above, an object of the invention is to adaptively perform insertion of added pilot symbols based on the propagation path state, to improve channel estimation precision.

A further object of the invention is to adaptively improve channel estimation precision even when motion velocity is high and the fading frequency is high.

A further object of the invention is to control addition of pilot symbols while relating this control to an adaptive control which determines data symbol modulation method, coding rate, spreading factor, transmission power, and similar, based on the propagation path state.

A further object of the invention is to switch transmission system from a transmission system by a single transmission antenna to a transmission system by a plurality of transmission antennas, such as MIMO (Multiple-Input-Multiple-Output), transmission-beam forming, and similar, based on the propagation path state or based on requests.

A further object of the invention is to enable the power of the basic pilot symbol and the number of the basic pilot symbols to be set in advance to small values.

A further object of the invention is to enable channel estimation by identifying the presence or absence of added pilot symbols, the number of symbols, and the added positions on the receiving side, and using added pilot symbols.

This invention relates to a wireless communication system and wireless communication method for transmitting and receiving frames comprising basic pilot symbols used in propagation path estimation, control symbols conveying control information necessary for data channel demodulation, and data symbols conveying information bits.

In a wireless communication system of this invention, a transmission device comprises a pilot addition decision portion that decides whether to add to frames pilot symbols which are separate from basic pilot symbols; a control symbol generation portion, which generates control symbols comprising information related to additional pilot symbols; a frame assembly portion, which assembles frames with the pilot symbols added according to the pilot addition decision; and a transmission portion, which transmits the frames.

A transmission device further comprises a propagation path information output portion, which acquires and outputs propagation path information relating to the state of the propagation path between the transmission device and the reception device wherein the pilot addition decision portion decides whether to add additional pilot symbols, and the number of additional pilot symbols to add, based on this propagation path information.

A transmission device further comprises a motion velocity acquisition portion, which acquires the motion velocity of the reception device wherein the pilot addition decision portion decides whether to arrange the additional pilot symbols in dispersed positions in a data symbol area, and positions of additional pilot symbols, according to the motion velocity of the reception device.

Further, a transmission device comprises a propagation path information output portion, which acquires and outputs propagation path information relating to the state of the propagation path between the transmission device and the reception device, and an adaptive control portion, which adaptively controls the transmission method based on the propagation path information wherein the pilot addition decision portion decides to add pilot symbols when transmission errors are not improved by the adaptive control.

Further, a transmission device comprises a plurality of transmission antennas, and a transmission portion corresponding to the respective transmission antennas wherein in a case where pilot symbols are not added, the frame assembly portion assembles a frame not comprising additional pilot symbols, to be transmitted from one transmission antenna, and in a case where pilot symbols are added, assembles said frame to be transmitted from the one transmission antenna, and frames to be transmitted from other transmission antennas, comprising additional pilot symbols, but comprising neither basic pilot symbols nor control symbols.

A reception device of a wireless communication system of the invention comprises a control symbol demodulation portion, which demodulates control symbols included in the received frames and judges whether additional pilot symbols are included in the received frames based on the control symbol information; a propagation path estimation portion which, when the additional pilot symbols are included, uses the additional pilot symbols to estimate the propagation path; and a data symbol demodulation portion, which demodulates data symbols based on the propagation path estimation value.

The propagation path estimation portion of the reception device comprises a first propagation path estimation portion, which estimates the propagation path using the basic pilot symbols, and a second propagation path estimation portion which, if additional pilot symbols exist, estimates the propagation path using the additional pilot symbols wherein the control symbol demodulation portion uses the first propagation path estimation values estimated by the first propagation path estimation portion to demodulate control symbols, and the data symbol demodulation portion uses the control symbol information and the second propagation path estimation values estimated by the second propagation path estimation portion to demodulate data symbols.

Further, a reception device comprises an error detection portion to detect errors in additional pilot information included in the control channel, and a second control symbol demodulation portion which, if no transmission errors have occurred in the additional pilot information, demodulates control symbols again based on the second propagation path estimation values, and the data symbol demodulation portion demodulates data symbols using the control symbols demodulated by the second control symbol demodulation portion and the second propagation path estimation values.

A wireless communication method of the invention has, on the transmitting side, a step of deciding whether or not to add pilot symbols which are separate from basic pilot symbols, to frames a step of generating control symbols comprising information relating to additional pilot symbols when pilot symbols are added, and a step of assembling and transmitting frames comprising the basic pilot symbols, control symbols, additional pilot symbols, and data symbols; and has, on the receiving side, a step of demodulating control symbols included in the received frame, a step of judging whether additional pilot symbols are included in the received frame based on the control symbol information, a step, when additional pilot symbols are included, of estimating the propagation path using the additional pilot symbols, and a step of demodulating data symbols using the propagation path estimation value.

BRIEF DESCRIPTION OF THE DRAWINGS

FIG. 4 is an explanatory diagram of a pilot addition criteria table, stored in an additional pilot information storage portion;

FIG. 5 explains positions within data symbols for pilot addition;

FIG. 19 explains antenna beam directionality;

FIG. 20 shows the frame configuration in the third embodiment;

DESCRIPTION OF THE PREFERRED EMBODIMENTS

(A) Summary of the Invention

Addition of Pilot Symbols

Figure 1:
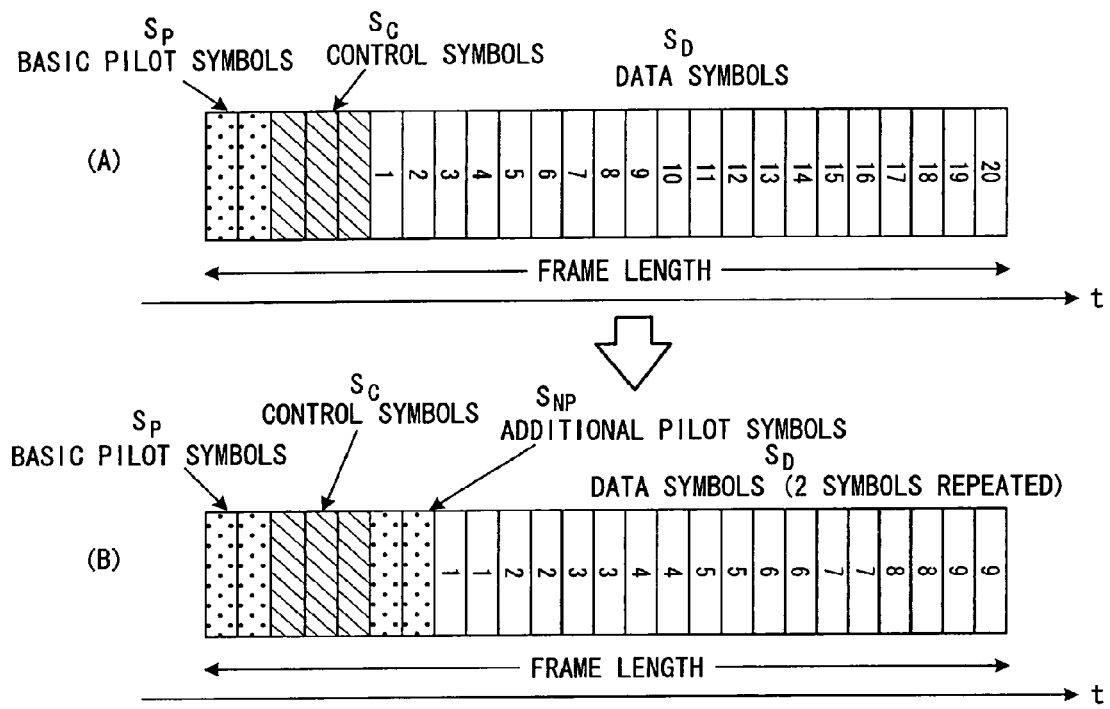
FIG. 1 is a first summary diagram of the invention.

For a user terminal which suffers poor communication quality due to location at a cell edge, the base station that is the transmitting side additionally inserts pilot symbols $S_{NP}$ which are separate from basic pilot symbols $S_P$ in the area of data symbols $S_D$, as shown in (B) of FIG. 1, and notifies the user terminal which is the receiving side of information relating to these additional pilot signals $S_{NP}$ by means of control symbols $S_C$. Conversely, when the user terminal becomes the transmitting side, and transmits data to the base station, if the communication quality between base station and user terminal is poor, pilot symbols $S_{NP}$ are additionally inserted into the area of data symbols $S_D$, and the base station which is the receiving side is notified of this information by means of control symbols $S_C$.

Additional insertion of pilot symbols $S_{NP}$ is decided according to the state of the propagation path between the transmitting station and receiving station. The propagation path state between the transmitting station and receiving station may be measured by the transmitting station, or the results of measurement by the receiving station may be fed back to the transmitting station. Parameters indicating the propagation path state may include the reception power, SIR (Signal to Interference power Ratio), delay spreading, Doppler frequency (fading frequency), and similar. A threshold for communication quality may be provided based on the measured results of such propagation path parameters, and when the communication quality is equal to or less than the threshold, the transmitting station decides on additional insertion of pilot symbols. The Doppler frequency is used to estimate the motion velocity of the mobile station or fading frequency.

Dispersion of Additional Pilot Symbols

Figure 2:
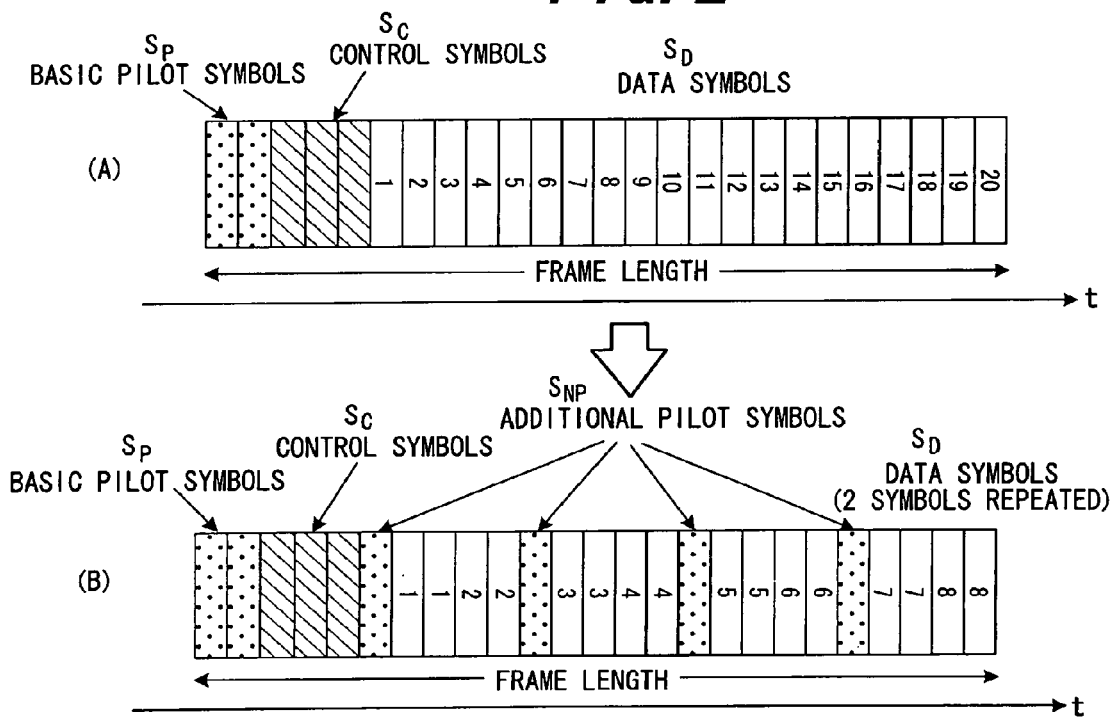
FIG. 2 is a second summary diagram of the invention.

When, among the propagation path parameters, the Doppler frequency is high, the propagation path fluctuations in the time-direction are rapid, and so the pilot symbols $S_{NP}$ are added to the date symbols and dispersed in the time direction as indicated in (B) of FIG. 2, and channel estimation is performed following propagation path fluctuations.

Control to Add Pilot Symbols in Connection with Adaptive Wireless Link Control

The transmitting station performs adaptive wireless link control for the data channel, and if further improvement of the communication quality of the uplink channel is no longer possible, additional insertion of pilot symbols $S_{NP}$ is performed. Also, when returning ACK/NACK signals through the data channel in retransmission control, if the error rate is not improved through adaptive wireless link control of the data channel, a decision is made for additional insertion of pilot symbols $S_{NP}$.

Addition of Pilot Symbols During Control of Transmission from a Plurality of Antennas When the transmitting station uses a plurality of transmission antennas for transmitting data channel in accordance with MIMO multiplexed transmission, transmission-diversity, transmission-beam forming and similar, pilot symbols different from the basic pilot symbols are additionally inserted into the area of data symbols.

In MIMO multiplexed transmission and diversity transmission, mutually orthogonal pilot signals must be transmitted from each transmission antenna. Consequently, orthogonal pilot symbols are inserted into the data symbol area for each transmission antenna.

In transmission-beam forming, additional pilot symbols multiplied by the same antenna weight as data symbols must be transmitted, and so additional pilot symbols that are beam-formed by the same antenna weight as data symbols are additionally inserted into the data symbol area.

Reception Control

At the transmitting station, a decision is made as to whether to insert additional pilot symbols and the number and positions of the additional pilot symbols, according to the propagation path state, or whether adaptive wireless link control parameters for the data channel can be modified, or whether a transmission method using multiple antennas is used, and the receiving station is notified of this information via the control channel.

In the receiving station, at first basic pilot symbols are used to perform channel estimation, and control channel demodulation is performed based on the channel estimation value. Next, based upon the demodulated control information, information such as the presence or absence of additional pilot symbols, the number of additional pilot symbols, and the additional pilot symbols positions is obtained. And in the case where additional pilot symbols have been inserted, the additional pilot symbols are used to again perform channel estimation. Finally, data channel demodulation is performed using the channel estimation values obtained using additional pilot symbols. Here, data channel demodulation may be performed using channel estimation values only for additional pilot symbols, or averages of additional pilot symbols and basic pilot symbols may be used as channel estimation values. Channel estimation values only for additional pilot symbols are used when the fading frequency is high.

Control when there are No Transmission Errors in Additional Pilot Information

The control channel is divided into a portion comprising additional pilot symbol information and another control information portion comprising wireless link parameters. And when there are no errors in additional pilot information, and there are errors in the other control information of the control channel, the channel estimation values estimated using the additional pilot symbols are employed to again perform control channel demodulation, to alleviate the control channel errors.

This invention relates to a wireless communication method having a frame configuration such as that shown in FIG. 1, and is not limited to transmission schemes used in communication. That is, this invention can also be applied to a case in which one symbol shown in FIG. 1 is modulated by multiple carriers, in addition to a case in which are symbol is modulated by a single carrier. For example, when applying this invention to the OFDM (Orthogonal Frequency Division Multiplexing) transmission scheme, which is a multiple carrier modulation method, one symbol in FIG. 1 is regarded as one OFDM symbol comprising a plurality of sub carrier-components, and this invention can be applied.

(B) First Embodiment (a) Configuration of Transmission Device

Figure 3:
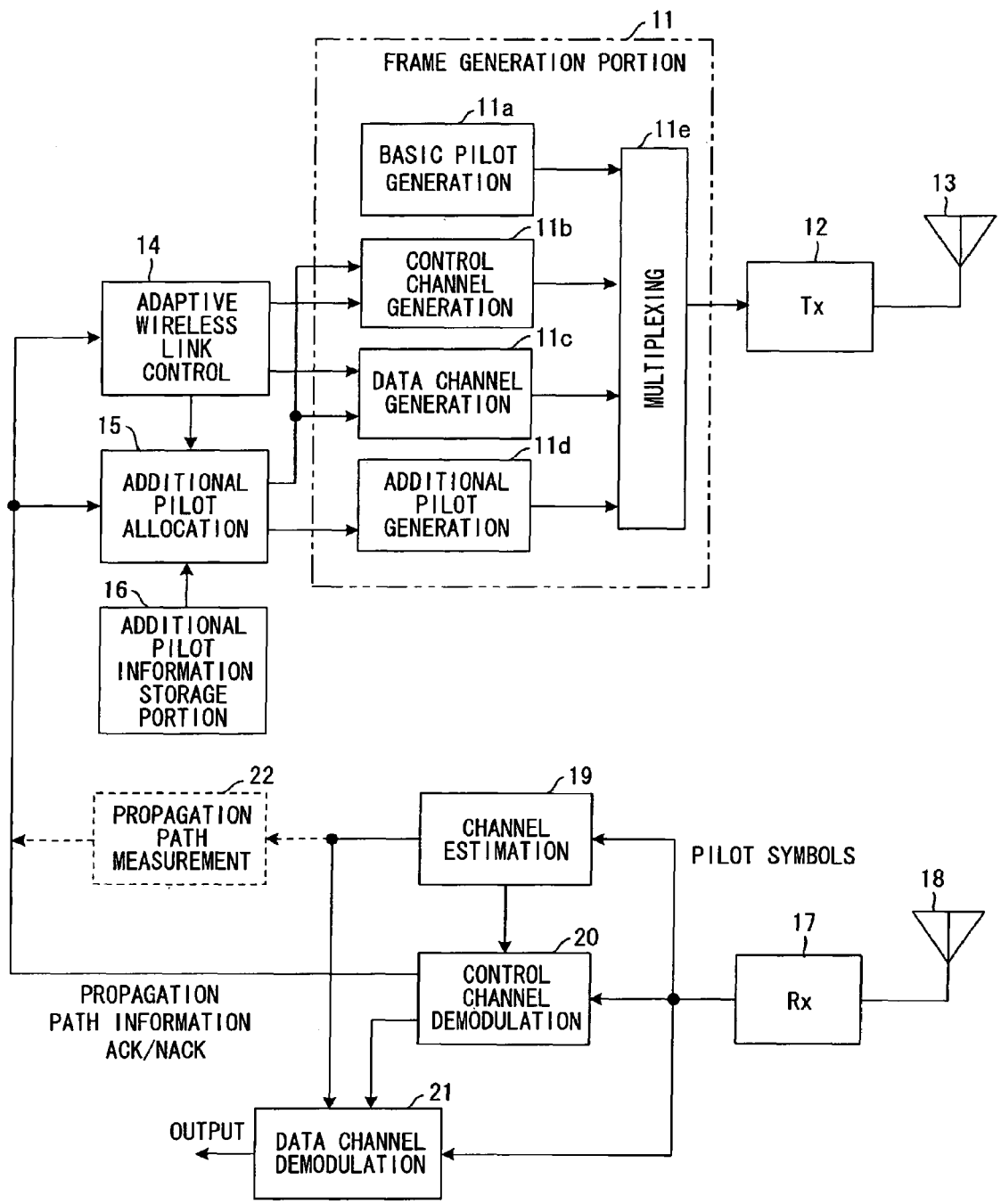
FIG. 3 shows the configuration of a transmission device of the invention.

FIG. 3 shows the configuration of a transmission device of the invention; the frame generation portion 11 has a basic pilot generation portion 11a which generates basic pilot symbols, a control channel generation portion 11b which generates control symbols, a data channel generation portion 11c which generates data symbols, an additional pilot generation portion 11d which generates additional pilot symbols, and a multiplexing portion 11e which performs multiplexing of these symbols. The frame generation portion 11 generates a frame such as that shown in (A) of FIG. 1 and (A) of FIG. 2 when additional pilot symbols $S_{NP}$ are not added, and generates a frame such as shown in (B) of FIG. 1 or in (B) of FIG. 2 when additional pilot symbols $S_{NP}$ are to be added, and outputs the frame. The transmission portion 12 orthogonally modulates frames generated by the frame generation portion 11, and up-converts the baseband transmission signal frequency to the radio frequency, amplifies the signal and outputs the result to the antenna 13.

The adaptive wireless link control portion 14 performs control to decide on the data channel modulation method and coding rate, spreading factor, and other link parameters, according to propagation path information indicating the state of the propagation path received from a communicating terminal (receiving station), or propagation path information indicating the state of the propagation path measured by the propagation path state measurement portion 22 within the transmission device itself, or ACK/NACK information received from the receiving station, or a request from the receiving station. At the same time, this decided information is input to the control channel generation portion 11b and data channel generation portion 11c. The adaptive wireless link control portion 14 also performs adaptive wireless link control of the data channel, and when the control to further improve the communication quality of the data channel is no longer possible, or when the error rate is not improved by retransmission control, information to this effect is input to the additional pilot allocation portion 15. Here, the control for improving the communication quality is lowering the modulation factor or reducing the coding rate, or increasing the spreading factor.

Based on the propagation path information (propagation path state), the additional pilot allocation portion (pilot addition decision portion) 15 decides to make space in the data channel and add pilot symbols (additional pilot symbols) which are separate from the basic pilot symbols. Similarly upon being notified by the adaptive wireless link control portion 14 that further control to improve the data channel communication quality is no longer possible, or upon being notified by the adaptive wireless link control portion 14 that the error rate is not improved by retransmission control, the additional pilot allocation is decides to add the additional pilot symbols to the data channel. The additional pilot allocation portion 15 also refers to a pilot symbol addition criteria table, stored in an additional pilot information storage portion 16, and based on the propagation path state (for example, the reception SIR), decides on the number of additional pilot symbols and the additional pilot symbols positions, and inputs the results to the control channel generation portion 11b, data channel generation portion 11c, and additional pilot generation portion 11d.

FIG. 4 explains the pilot symbol addition criteria table stored in the additional pilot information storage portion 16; (A) of FIG. 4 is a correspondence table between pilot symbol addition criteria and the number added, and (B) of FIG. 4 is a table of pilot symbol addition positions and addition order. From the table in (A) of FIG. 4, when the reception SIR is equal to or above a prescribed value, no pilot symbols are added, but when the reception SIR is equal to or less than a prescribed value, pilot symbols are added, and the poorer the reception SIR, the greater the number of additional pilot symbols. As is clear from the table of (B) of FIG. 4, when the Doppler frequency is less than 100 Hz, that is, when the motion velocity of the mobile terminal which is the receiving terminal is slow, the additional pilot symbols are not dispersed; but when the Doppler frequency is 100 Hz or higher, that is, when the mobile terminal which is the receiving terminal is moving rapidly, the additional pilot symbols are dispersed and arranged. The reason for dispersed arrangement is that the propagation path (channel) cannot be estimated with good precision by the fixed arrangement of pilot symbols when the fading frequency is high due to the high velocities.

FIG. 5 explains pilot addition positions among data symbols; (A) indicates pilot addition positions for the fixed arrangement, and (B) indicates pilot addition positions for the dispersed arrangement, showing addition positions for each of the cases in which the number of additional pilot symbols is one through four.

Returning to FIG. 3, the control channel generation portion 11b creates control symbols comprising link parameters and information relating to additional pilot symbols (whether additional pilot symbols are present, the number added, added positions), and the data channel generation portion 11c creates data symbols based on the link parameters, while also creating data symbols such that no data symbols are arranged in the additional pilot symbols positions indicated by the additional pilot allocation portion 15.

The reception portion 17 receives signals sent from the receiving station via the antenna 18, down-converts the frequency of the received radio signals to the baseband frequency, and then performs orthogonal demodulation and inputs the signals to the channel estimation portion 19, control channel demodulation portion 20, and data channel demodulation portion 21. The channel estimation portion 19 uses pilot symbols to estimate the uplink propagation path (channel) from the receiving station such as mobile terminal, and the control channel demodulation portion 20 uses the channel estimation value to demodulate control channel signals sent from the receiving station, and notifies the adaptive wireless link control portion 14 and additional pilot allocation portion 15 of the propagation path information transmitted via the control channel as well as ACK/NACK and other information. The propagation path information is information indicating the state of the downlink propagation path as measured by the receiving station. When the downlink and uplink radio frequencies are not very different, and the downlink and uplink wireless states can be assumed to be equivalent, a propagation path measurement portion 22 can be provided, which measures the propagation path state and notifies the adaptive wireless link control portion 14 and additional pilot allocation portion 15, and in such a case the receiving station need not measure propagation path information and provide feedback.

The data channel demodulation portion 21 uses the above channel estimation values as well as control information which identifies the modulation method, coding rate and similar to demodulate data symbols and output the results.

(b) Pilot Addition Control

Figure 6:
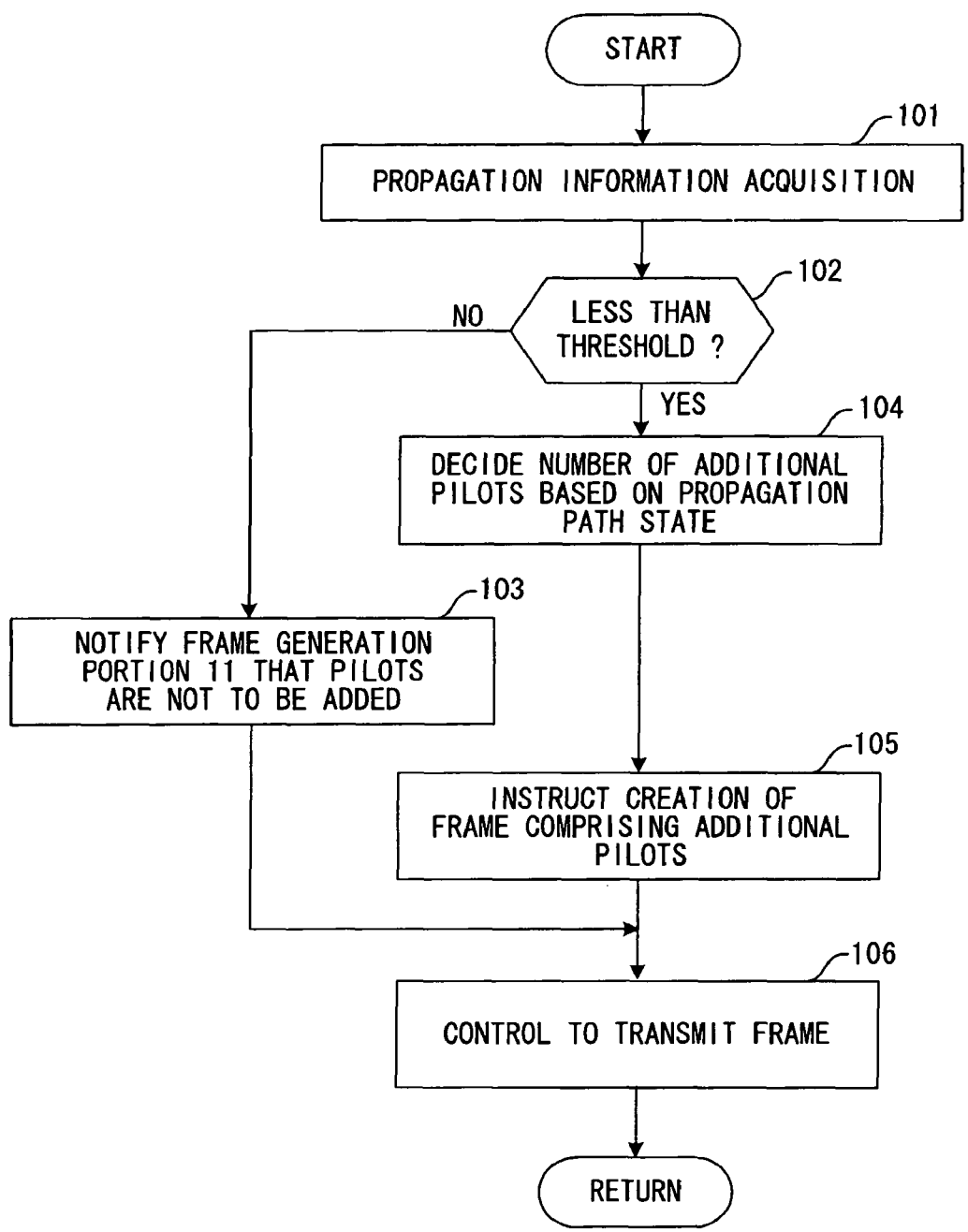
FIG. 6 shows the first flow of processing for pilot addition control by an additional pilot allocation portion.

FIG. 6 shows the flow of processing for first pilot addition control by the additional pilot allocation portion 15. Here dispersion control of additional pilot symbols is not performed.

The additional pilot allocation portion 15 acquires propagation path information, such as for example the reception SIR (step 101), judges whether the reception SIR is less than a threshold (in the example of FIG. 4, 10 dB) (step 102), and if the value is equal to or greater than the threshold, instructs the frame generation portion 11 not to add pilot symbols (step 103). If on the other hand the reception SIR is less than the threshold, then the number of pilot symbols to be added is decided based on the reception SIR, referring to the table in (A) of FIG. 4 (step 104), and the frame generation portion 11 is instructed to create a frame comprising this number of added pilot symbols (step 105).

When no pilot symbols are to be added, the frame generation portion 11 creates a frame as in (A) of FIG. 1, and when pilot symbols are to be added, creates a frame as in (B) of FIG. 1, and the transmission portion 12 executes control to transmit the frame thus created (step 106).

By means of the above-described additional pilot control, insertion of additional pilot symbols is performed adaptively based on the propagation path state, and the channel estimation precision can be improved.

Figure 7:
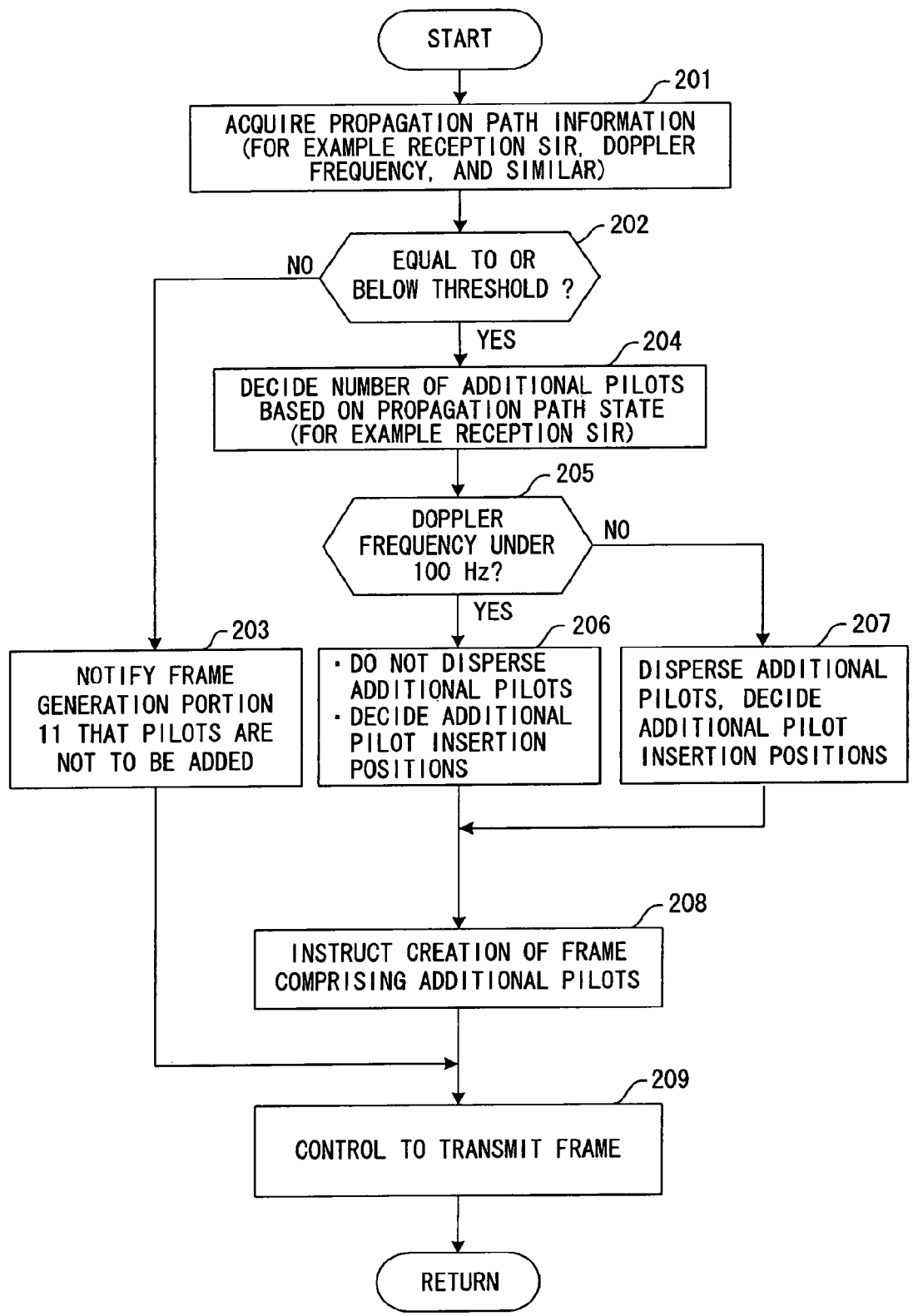
FIG. 7 shows the second flow of processing for pilot addition control by the additional pilot allocation portion.

FIG. 7 shows the flow of second pilot addition control by the additional pilot allocation portion 15, in a case in which additional pilot symbols dispersion control is performed.

The additional pilot allocation portion 15 acquires propagation path information, such as for example the reception SIR and Doppler frequency (step 201), judges whether the reception SIR is less than a threshold (step 202), and if the value is equal to or greater than the threshold, instructs the frame generation portion 11 not to add pilot symbols (step 203). If on the other hand the reception SIR is equal to or greater than the threshold, the number of pilot symbols to add is decided based on the reception SIR (step 204), and a judgment is made as to whether the Doppler frequency is less than 100 Hz (step 205). If the Doppler frequency is less than 100 Hz, so that the motion velocity of the receiving terminal is slow, then an addition position decision is made such that additional pilot symbols are not dispersed (step 206), but if the Doppler frequency is equal to or greater than 100 Hz, so that the motion velocity of the receiving station is fast, then the addition positions are decided such that the additional pilot symbols are dispersed (step 207), and the frame generation portion 11 is instructed to create a frame comprising the additional pilot symbols (step 208).

The frame generation portion 11 creates a frame such as shown in (A) of FIG. 2 when pilot symbols are not added, creates a frame such as shown in (B) of FIG. 1 when pilot symbols are to be added but not dispersed, and creates a frame such as shown in (B) of FIG. 2 when pilot signals are to be added and dispersed; the transmission portion 12 then executes control to transmit the created frame (step 209).

By means of the above pilot symbol addition control, even when the motion velocity of the mobile station is fast and the fading frequency is high, by dispersing the positions of the additional pilot symbols, the channel estimation precision can be adaptively improved.

Figure 8:
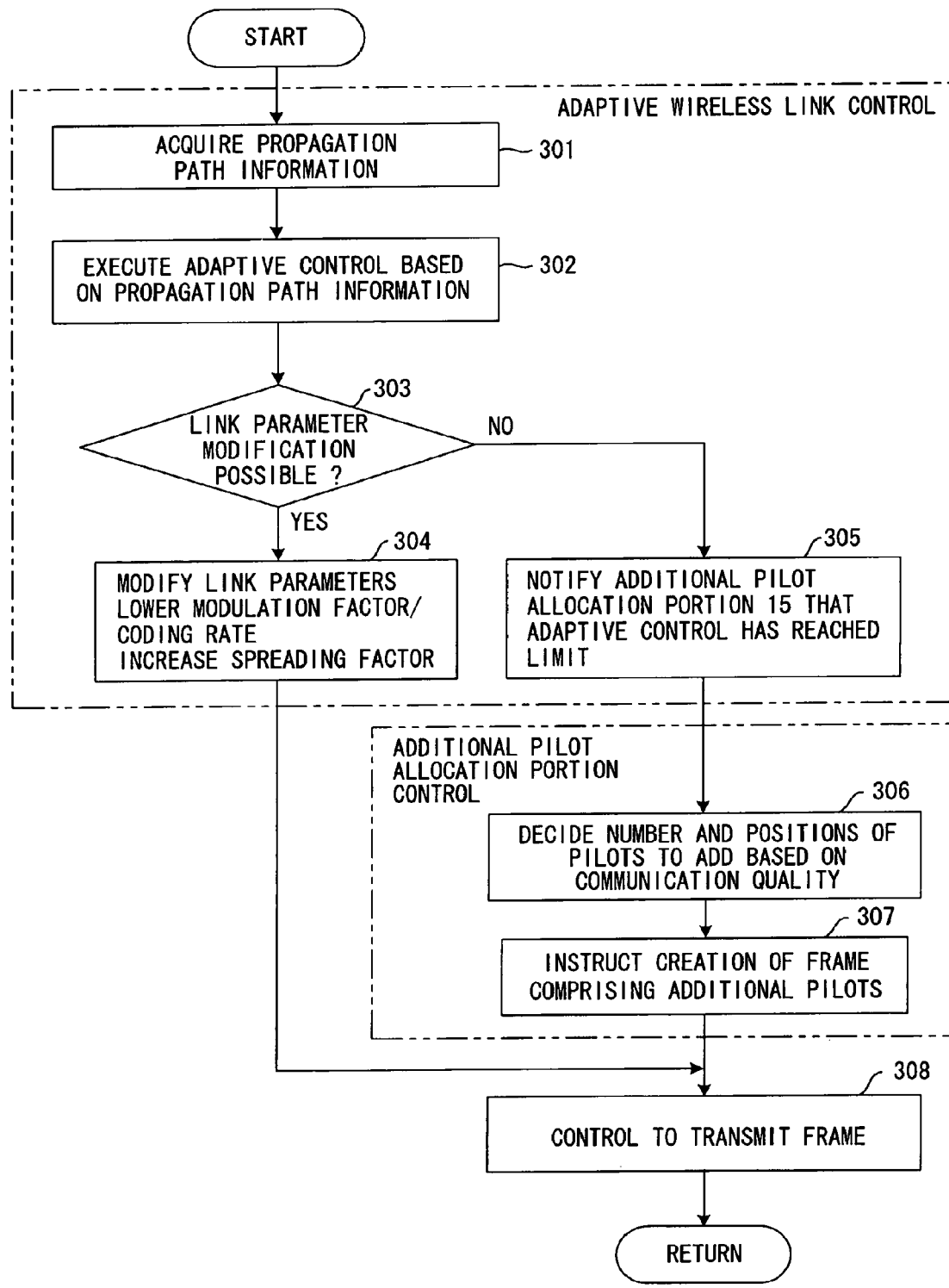
FIG. 8 shows the third flow of processing for pilot addition control by the additional pilot allocation portion.

FIG. 8 shows the flow of processing for third pilot addition control by the additional pilot allocation portion 15, performed in cases when there is notification from the adaptive wireless link control portion 14 that control to further improve the data channel communication quality is not possible.

The adaptive wireless link control portion 14 acquires propagation path information (step 301), and performs adaptive control based on the propagation path information (step 302).

In this adaptive control, the adaptive wireless link control portion 14 checks, based on the propagation path information, whether the data channel modulation method, coding rate, spreading factor, and other link parameters can be modified (step 303); if parameters can be modified, these link parameters are modified (step 304). That is, the adaptive wireless link control portion 14 lowers the modulation factor and coding rate, or increases the spreading factor, when the reception quality is poor. Then, data is transmitted according to this adaptive control (step 308).

If on the other hand in step 303 the link parameters cannot be modified, the adaptive wireless link control portion 14 notifies the additional pilot allocation portion 15 that adaptive control cannot be used to further improve the data channel communication quality (step 305).

Upon being notified by the adaptive wireless link control portion 14 that further improvement of the data channel communication quality by adaptive control is not possible, the additional pilot allocation portion 15 decides the number of pilot symbols to add and the addition positions based on the reception SIR (step 306), and instructs the frame generation portion 11 to create a frame comprising the number of pilot symbols to be added, in the addition positions (step 307).

the frame generation portion 11 creates a frame as in (A) of FIG. 1 when pilot symbols are not to be added, and creates a frame as in (B) of FIG. 1 or (B) of FIG. 2 when pilot symbols are to be added, and the transmission portion 12 executes control to transmit the created frame (step 308).

According to the above-described pilot symbol addition control, through the control to add additional pilot symbols in conjunction with the adaptive wireless link control of the data channel, not only can the S/N of data channel be improved, but the precision of channel estimation can simultaneously be improved, so that system throughput can be enhanced.

Figure 9:
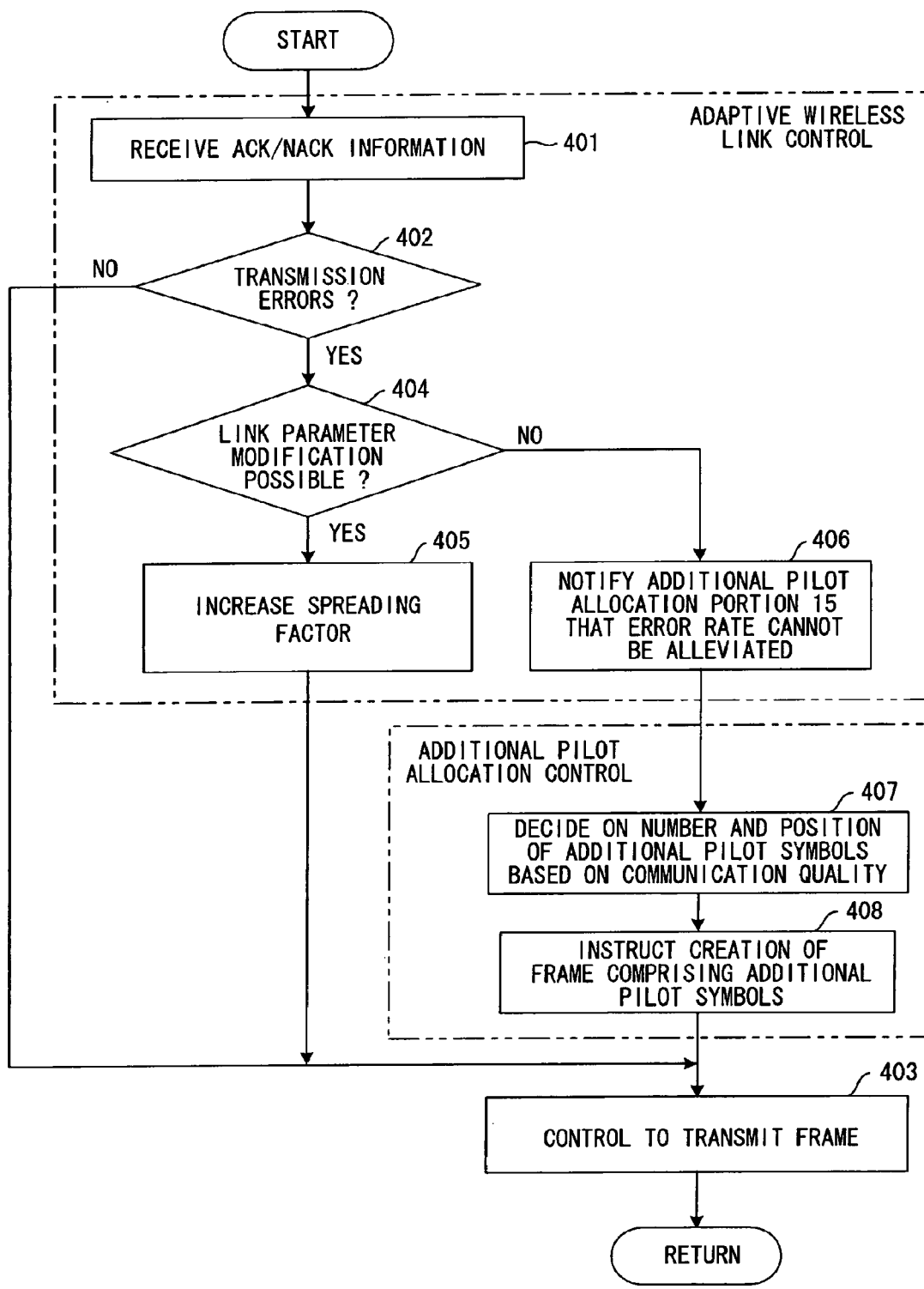
FIG. 9 shows the fourth flow of processing for pilot addition control by the additional pilot allocation portion.

FIG. 9 shows the flow of processing for fourth pilot addition control by the additional pilot allocation portion 15, when there is notification from the adaptive wireless link control portion 14 that the error rate cannot be improved through adaptive control.

The adaptive wireless link control portion 14 acquires ACK/NACK information (step 401), and based on the ACK/NACK information judges whether there are transmission errors (step 402); if there are no transmission errors, the transmission portion 12 executes control to transmit the created frame (step 403).

If on the other hand there are transmission errors, the adaptive wireless link control portion 14 checks whether link parameters, such as the spreading factor, can be modified (step 404), and if modification is possible, performs modification so as to increase the spreading factor (step 405). Spreading factor control can be performed by increasing or decreasing the number of data symbol repetitions. Then, the transmission portion 12 executes control to transmit the created frame (step 403).

If in step 404 modification of the spreading factor is not possible, the adaptive wireless link control portion 14 notifies the additional pilot allocation portion 15 of the fact that the error rate cannot be improved through adaptive control (step 406).

Upon notification from the adaptive wireless link control portion 14 that the error rate cannot be improved through adaptive control, the additional pilot allocation portion 15 decides on the number of pilot symbols to be added and the addition positions based on the reception SIR (step 407), and instructs the frame generation portion 11 to create a frame comprising the number of pilot symbols to be added in the addition positions (step 408).

The frame generation portion 11 creates a frame such as in (A) of FIG. 1 when pilot symbols are not to be added, and creates a frame such as in (B) of FIG. 1 or (B) of FIG. 2 when pilot symbols are to be added, and the transmission portion 12 executes control to transmit the created frame (step 403).

By means of the above-described pilot symbol addition control, pilot symbols are added when transmission errors are not alleviated, so that the S/N of data symbol can be improved through adaptive control, and in addition the channel estimation precision can be improved through pilot addition.

(c) First Configuration of a Reception Device

Figure 10:
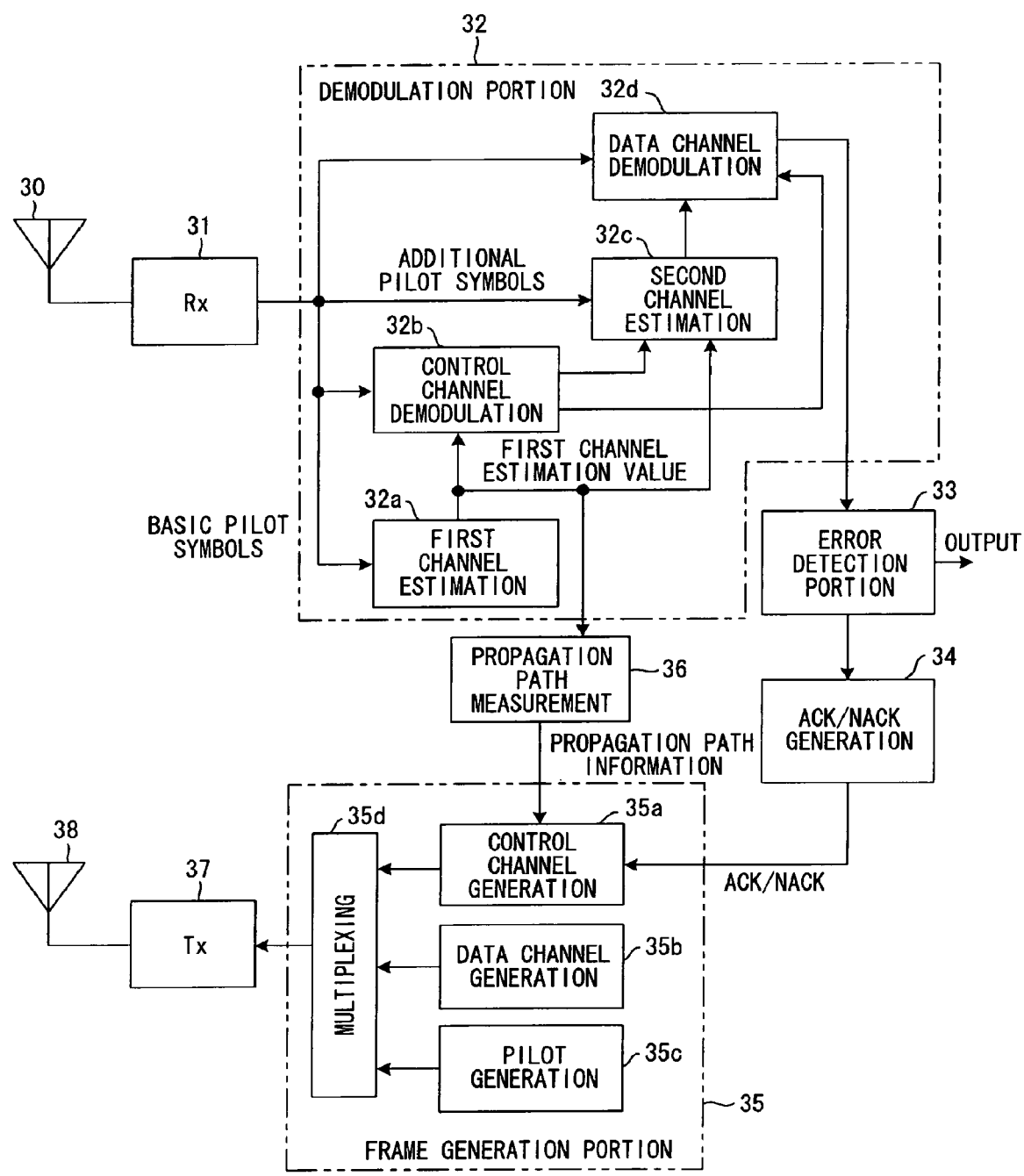
FIG. 10 shows a first configuration of a reception device.

FIG. 10 shows a first configuration of a reception device. The reception portion 31 receives signals sent from the transmission device (for example, abase station) via the antenna 30, down-converts the frequency of the received radio signal to the baseband frequency, and then performs orthogonal demodulation of the received frame and inputs the results to the first channel estimation portion 32*a*, control channel demodulation portion 32*b*, second channel estimation portion 32*c*, and data channel demodulation portion 32*d* of the demodulation portion 32.

The first channel estimation portion 32*a* uses the basic pilot symbols included in the received frame to perform channel estimation, and outputs the first channel estimation value thus obtained. The control channel demodulation portion 32*b* demodulates the control channel based on the first channel estimation value, and based on the additional pilot information included in the demodulated control channel, confirms whether additional pilot symbols are present and the positions thereof, and if additional pilot symbols are included, instructs the second channel estimation portion 32*c* to execute channel estimation using the additional pilot symbols. The control channel demodulation portion 32*b* also notifies the data channel demodulation portion 32*d* of the data channel adaptive wireless link parameters and additional pilot symbol position information.

The second channel estimation portion 32*c* performs channel estimation using the additional pilot symbols according to the instruction from the control channel demodulation portion 32*b* and inputs the second channel estimation value thus obtained to the data channel demodulation portion 32*d*. The second channel estimation portion 32*c* can also perform averaging of the first channel estimation value and second channel estimation value and similar to calculate a third channel estimation value and improve the channel estimation precision, and can input this third channel estimation value to the data channel demodulation portion 32*d*. On the other hand, if it is found that additional pilot symbols are not included, the control channel demodulation portion 32*b* issues an instruction to the second channel estimation portion 32*c* to input the first channel estimation value to the data channel demodulation portion 32*d*.

When additional pilot symbols are not included, the data channel demodulation portion 32*d* performs data channel demodulation according to the first channel estimation value and the control symbol information (wireless link parameters and similar).

The error detection portion 33 detects the presence or absence of errors in the data channel, and inputs the detection result to the ACK/NACK generation portion 34, and if there are no errors, outputs the data symbols of the data channel. The ACK/NACK generation portion 34 generates ACK/NACK based on the presence or absence of errors, and inputs the result to the control channel generation portion 35*a* of the frame generation portion 35. The propagation path measurement portion 36 uses the first channel estimation value measured by the first channel estimation portion 32*a* of the demodulation portion 32 to measure the propagation path state (reception SIR, received power, delay spread, Doppler frequency, and similar), and based on the measurement results creates propagation path information and inputs this to the control channel generation portion 35*a*. If the channel estimation is $A \cdot \exp(j\theta)$, then the received power is $|A|^2$. The methods of measurement of the reception SIR, delay spread, Doppler frequency and similar are well-known, and a detailed explanation is here omitted.

The control channel generation portion 35*a* of the frame generation portion 35 generates control symbols comprising ACK/NACK and propagation path information, the data channel generation portion 35*b* generates data symbols, the basic pilot generation portion 35*c* generates basic pilot symbols, and the multiplexing portion 35*d* multiplexes and outputs these symbols. Similarly to the transmission device, the reception device can also execute control to add pilot symbols which are different from the basic pilot symbols; but this explanation assumes that pilot addition control is not performed. The transmission portion 37 performs orthogonal modulation using frames generated by the frame generation portion 35, up-converts the frequency of baseband transmission signals thus obtained to the radio frequency and performs amplification, and transmits the signals to the transmission device from the antenna 38.

Figure 11:
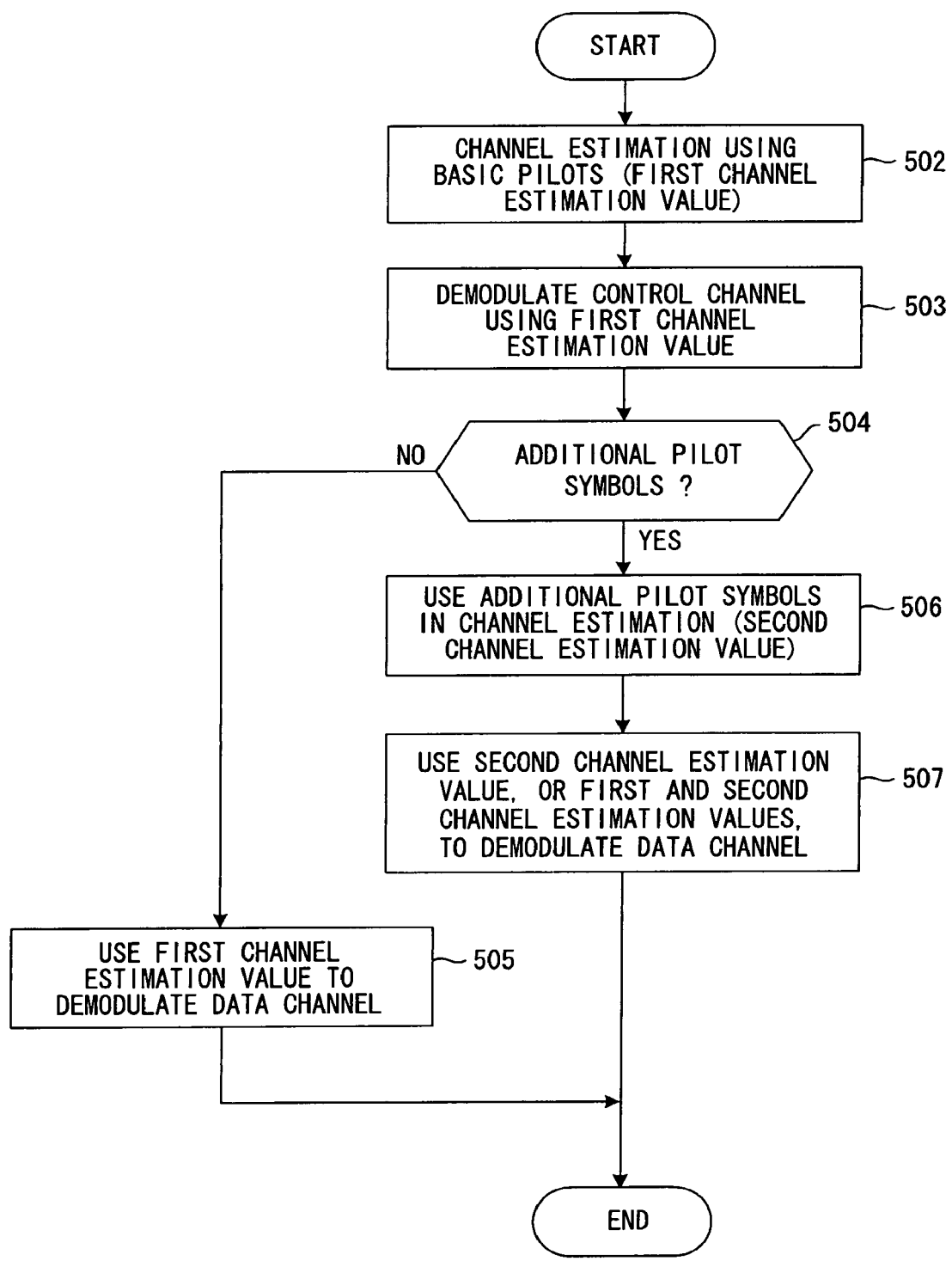
FIG. 11 shows the flow of demodulation processing by a demodulation portion in a reception device.

FIG. 11 shows the flow of demodulation processing by the demodulation portion 32 in the reception device.

First, using basic pilot symbols included in a received frame, the propagation path is estimated and a first channel estimation value is output (step 502). Then, this first channel estimation value is used to demodulate the control channel included in the received frame (step 503), and based on control symbol information, a check is performed to determine whether additional pilot symbols are included in the received frame (step 504); if no additional pilot symbols are included, the first channel estimation value is used to demodulate the data channel (step 505).

On the other hand, if in step 504 the additional pilot symbols are included in the received frame, the additional pilot symbols are used to estimate the propagation path, and a second channel estimation value is output (step 506). Then, this second channel estimation value is used to demodulate the data channel (step 507).

The first channel estimation value and second channel estimation value can also be averaged or otherwise processed to calculate a third channel estimation value, to raise the channel estimation precision, and the third channel estimation value can be used to demodulate the data channel. When the fading frequency is high, the second channel estimation value estimated using additional pilot symbols in dispersed positions may be used to demodulate the data channel, and when the fading frequency is low, the third channel estimation value may be used for data channel demodulation.

In the above, the transmission device uses the control channel to convey the presence or absence of additional pilot symbols and the number of symbols, the positions at which symbols are added, and other information, and so the reception device can identify the presence or absence of additional pilot symbols, the number of symbols, and added positions, and can use the additional pilot symbols in channel estimation.

(d) Second Configuration of a Reception Device

When the control channel is divided into a portion comprising additional pilot symbols information and another control information portion comprising wireless link parameters, there are cases in which no errors occur in the additional pilot information, but errors occur in the control information other than the additional pilot information. In such cases, a channel estimation value estimated employing the additional pilot symbols can be used to again perform demodulation of the control channel, to alleviate the control channel errors.

Figure 12:
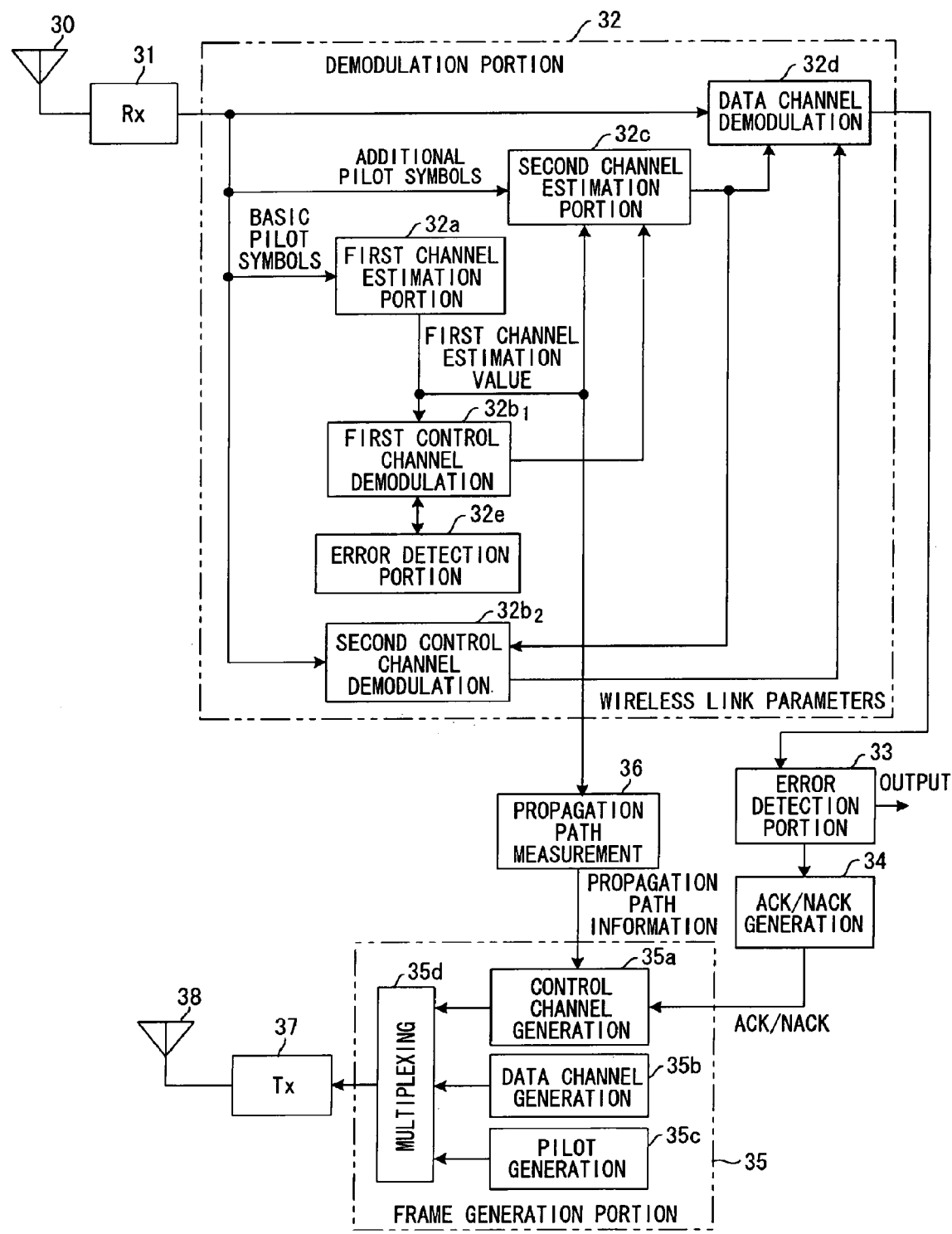
FIG. 12 shows a second configuration of a reception device which alleviates control channel errors.

FIG. 12 is a second configuration of a reception device, with the above control channel errors alleviated; portions which are the same as in the reception device of FIG. 10 are assigned the same symbols. The different point is the configuration of the demodulation portion 32 in which first and second control channel demodulation portions 32b₁ and 32b₂ are provided as control channel demodulation portions in the demodulation portion 32, and an error detection portion 32e is provided.

Figure 13:
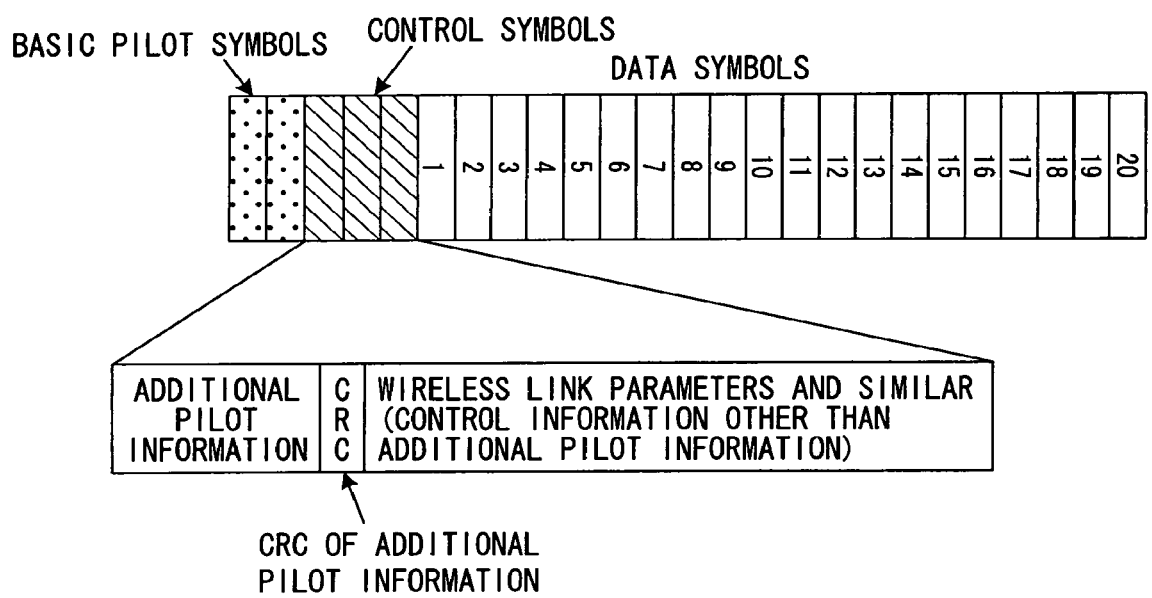
FIG. 13 shows a frame configuration.

In this embodiment, as shown in FIG. 13, the control channel is divided into an additional pilot information portion, and another control information portion comprising wireless link parameters other than additional pilot information; error detection information (CRC information) is appended to the additional pilot information.

The first channel estimation portion 32a performs channel estimation using basic pilot symbols. The first control channel demodulation portion 32b₁ demodulates the control channel using the first channel estimation value and inputs the demodulation results to the error detection portion 32e. The error detection portion 32e performs error detection of additional pilot information included in the demodulation results.

If no errors are detected in the additional pilot information, and the additional pilot information indicates that additional pilot symbols are included, the first control channel demodulation portion 32b₁ instructs the second channel estimation portion 32c to execute channel estimation using the additional pilot symbols. As a result of this instruction, the second channel estimation portion 32c uses the additional pilot symbols to perform channel estimation, and inputs the second channel estimation value thus obtained to the data channel demodulation portion 32d and to the second control channel demodulation portion 32b₂.

By averaging the first channel estimation value and second channel estimation value to determine a third channel estimation value, the channel estimation precision is improved, and the second control channel demodulation portion 32b₂ and data channel demodulation portion 32d can be notified of the third channel estimation value thus obtained.

The second control channel demodulation portion 32b₂ again demodulates the control channel based on the channel estimation value obtained by the second channel estimation portion 32c, and notifies the data channel demodulation portion 32d of the adaptive wireless link parameters and additional pilot symbol position information. The data channel demodulation portion 32d performs data channel demodulation based on the second channel estimation value or third channel estimation value and on the control symbol information (wireless link parameters and additional pilot symbol position information, and similar).

Upon a judgment that additional pilot symbols are not included, the first control channel demodulation portion 32b₁ instructs the second channel estimation portion 32c to input the first channel estimation value to the data channel demodulation portion 32d.

In this way, when channel estimation using basic pilot symbols and control channel demodulation using the first channel estimation value are performed, if there are no transmission errors in the additional pilot information, the additional pilot symbols can be used in channel estimation, and the resulting second channel estimation value can be used to again demodulate the control symbol portion; hence even when transmission errors occur in control information other than additional pilot information demodulated using the first channel estimation value, control symbols can be correctly demodulated using the second channel estimation value, so that transmitted data symbols can be correctly received and demodulated.

Figure 14:
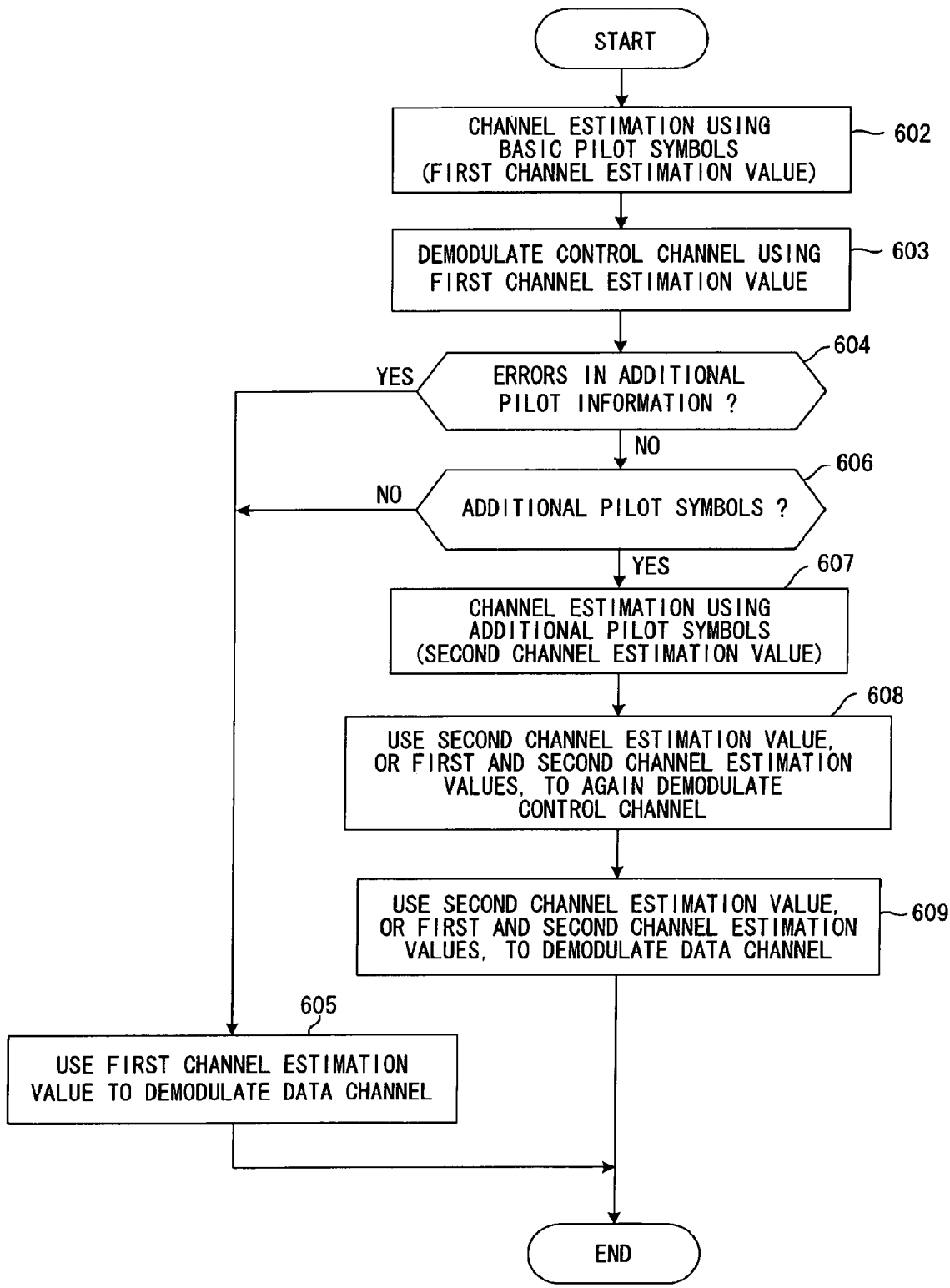
FIG. 14 shows the flow of demodulation processing in the demodulation portion of the reception device of FIG. 12.

FIG. 14 shows the flow of demodulation control processing of the demodulation portion 32 in the reception device of FIG. 12.

First, the basic pilot symbols included in the received frame are used to estimate the propagation path, and a first channel estimation value is output (step 602). Then, this first channel estimation value is used to demodulate the control channel included in the received frame (step 603), and based on the control symbol information, detection of errors in the additional pilot information is performed (step 604); if there are errors, the first channel estimation value is used to demodulate the data channel (step 605).

If there are no errors in the additional pilot information, a check is performed for the existence of additional pilot symbols (step 606), and if none exist, the processing of step 605 is performed.

On the other hand, if in step 606 the additional pilot symbols exist, then the additional pilot symbols are used to estimate the propagation path, and a second channel estimation value is output (step 607), then the control channel is demodulated again based on the second channel estimation value (step 608), and the adaptive wireless link parameters and additional pilot symbol position information are acquired, and data channel demodulation is performed based on these values (step 609).

(C) Second Embodiment

Figure 15:
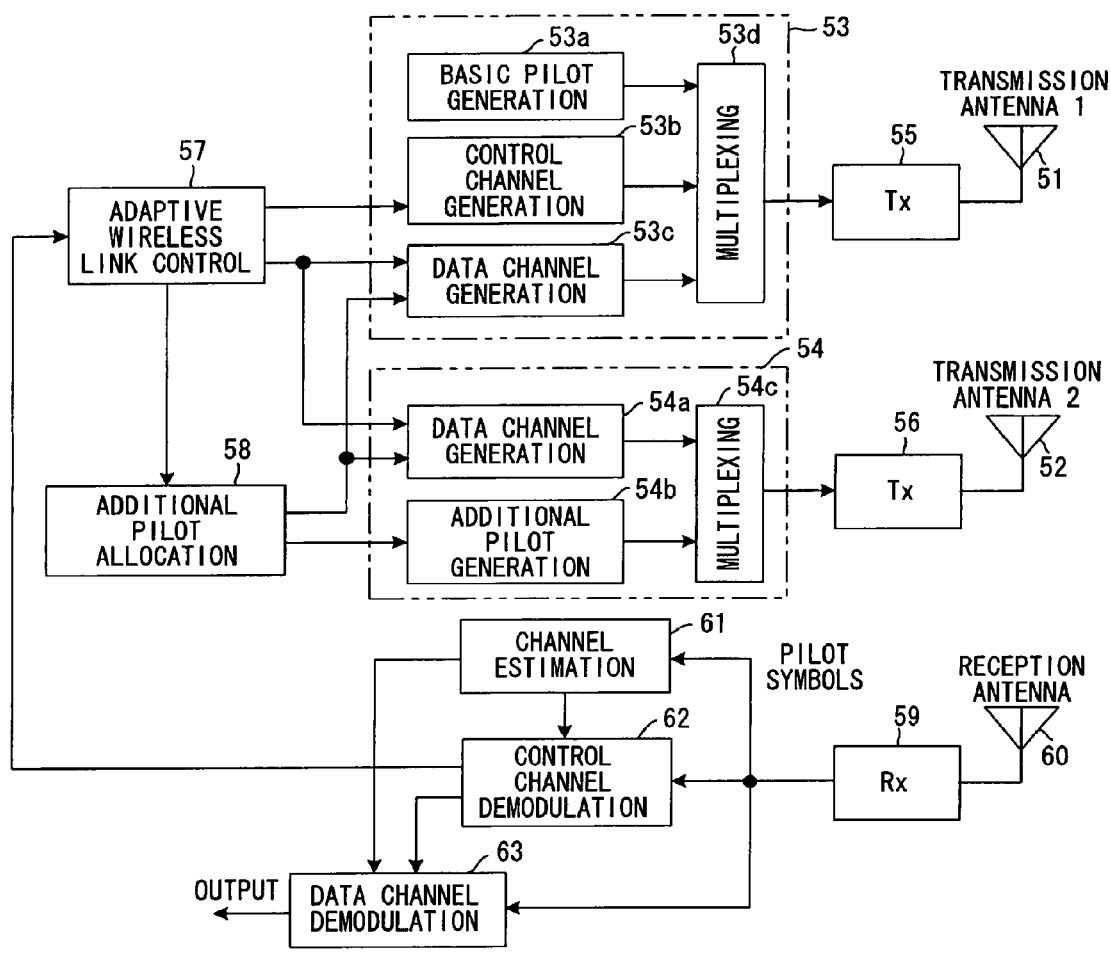
FIG. 15 shows the configuration of the transmission device of a second embodiment.

FIG. 15 shows the configuration of the transmission device in a second embodiment; the device has a configuration enabling both transmission using a single transmission antenna, and MIMO multiplexed transmission.

In the event of MIMO multiplexed transmission, the transmission device uses two transmission antennas 51, 52, transmitting independent data channels from the transmission antennas 51, 52; when MIMO multiplexed transmission is not performed, a data channel is transmitted only from transmission antenna 51.

The first frame generation portion 53 assembles a frame not comprising additional pilot symbols, to be transmitted from one transmission antenna 51, and the second frame generation portion 54 assembles a frame to be transmitted from the other transmission antenna 52, comprising additional pilot symbols, but not comprising basic pilot symbols or control symbols.

Figure 16:
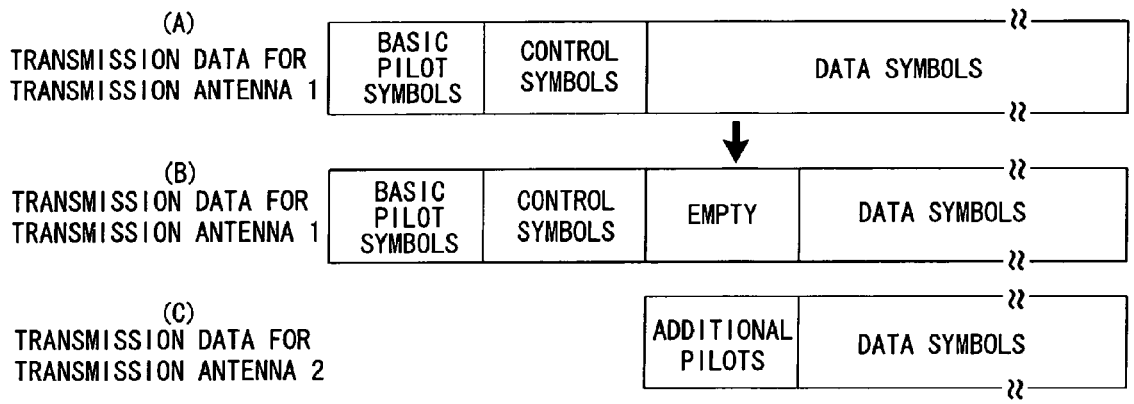
FIG. 16 shows the frame configuration in the second embodiment.

That is, the frame generation portion 53 comprises a basic pilot generation portion 53a, which generates basic pilot symbols; a control channel generation portion 53b, which generates control symbols; a data channel generation portion 53c, which generates data symbols; and a multiplexing portion 53d, which multiplexes and outputs these symbols. When transmission is from a single transmission antenna 51 without performing MIMO multiplexed transmission, the frame generation portion 53 generates and outputs a frame such as in (A) of FIG. 16. The transmission portion 55 performs orthogonal modulation, frequency up-converting and other wireless processing of the frame generated by the frame generation portion 53, and transmits the frame from the antenna 51.

The frame generation portion 54 has a data channel generation portion 54a which generates data symbols, an additional pilot generation portion 54b which generates additional pilot symbols, and a multiplexing portion 54c which multiplexes and outputs these symbols. When performing MIMO multiplexing and transmission, the frame generation portion 54 generates and outputs frames such as in (C) of FIG. 16. The transmission portion 56 performs wireless processing of frames generated by the frame generation portion 54, and transmits the frames from the antenna 52. During MIMO multiplexing and transmission, the frame generation portion 53 generates and outputs frames with spaces made in additional pilot symbol portions of the data symbol area, as shown in (B) of FIG. 16, and the transmission portion 55 performs wireless processing and transmits the frames from the antenna 51. The control symbols are made to comprise information indicating whether MIMO multiplexed transmission is being performed.

The adaptive wireless link control portion 57 executes control to decide the data channel modulation method, coding rate, spreading factor, and other link parameters according to propagation path information received from the mobile terminal (receiving terminal) indicating the state of the propagation path, or propagation path information indicating the propagation path state measured by a propagation path state measurement portion (not shown) within the transmission device, or ACK/NACK information received from the receiving terminal, and at the same time inputs this information to the control channel generation portion 53b and data channel generation portions 53c, 54a. Further, when there is a high-speed transmission request from the receiving station, the adaptive wireless link control portion 57 inputs to the additional pilot allocation portion 58 an instruction to switch from transmission using a single transmission antenna 51 to MIMO multiplexed transmission using a plurality of transmission antennas 51, 52.

When a MIMO multiplexed transmission instruction is input, the additional pilot allocation portion 58 instructs the additional pilot generation portion 54b to generate additional pilot symbols, providing the number of additional pilot symbols and the additional pilot symbol positions, and inputs the additional pilot symbol positions to the data channel generation portions 53c and 54a. As a result, the frame generation portion 53 generates a frame such as in (B) of FIG. 16, the frame generation portion 54 generates a frame such as in (C) of FIG. 16, and the frames are transmitted from the transmission antennas 51, 52.

The reception portion 59 receives signals sent from the reception device via the antenna 60, down-converts the frequency of the received radio signals to the baseband frequency, and then performs orthogonal demodulation and inputs the results to the channel estimation portion 61, control channel demodulation portion 62, and data channel demodulation portion 63. The channel estimation portion 61 uses pilot symbols to estimate the uplink channel from the reception device (mobile terminal), and the control channel demodulation portion 62 uses the channel estimation value to demodulate the control channel sent from the reception device, and notifies the adaptive wireless link control portion 57 of propagation path information, ACK/NACK information, high-speed transmission requests, and similar transmitted via the control channel. The data channel demodulation portion 63 uses the channel estimation value as well as control information specifying the modulation method, coding rate and similar to demodulate and output data symbols.

Figure 17:
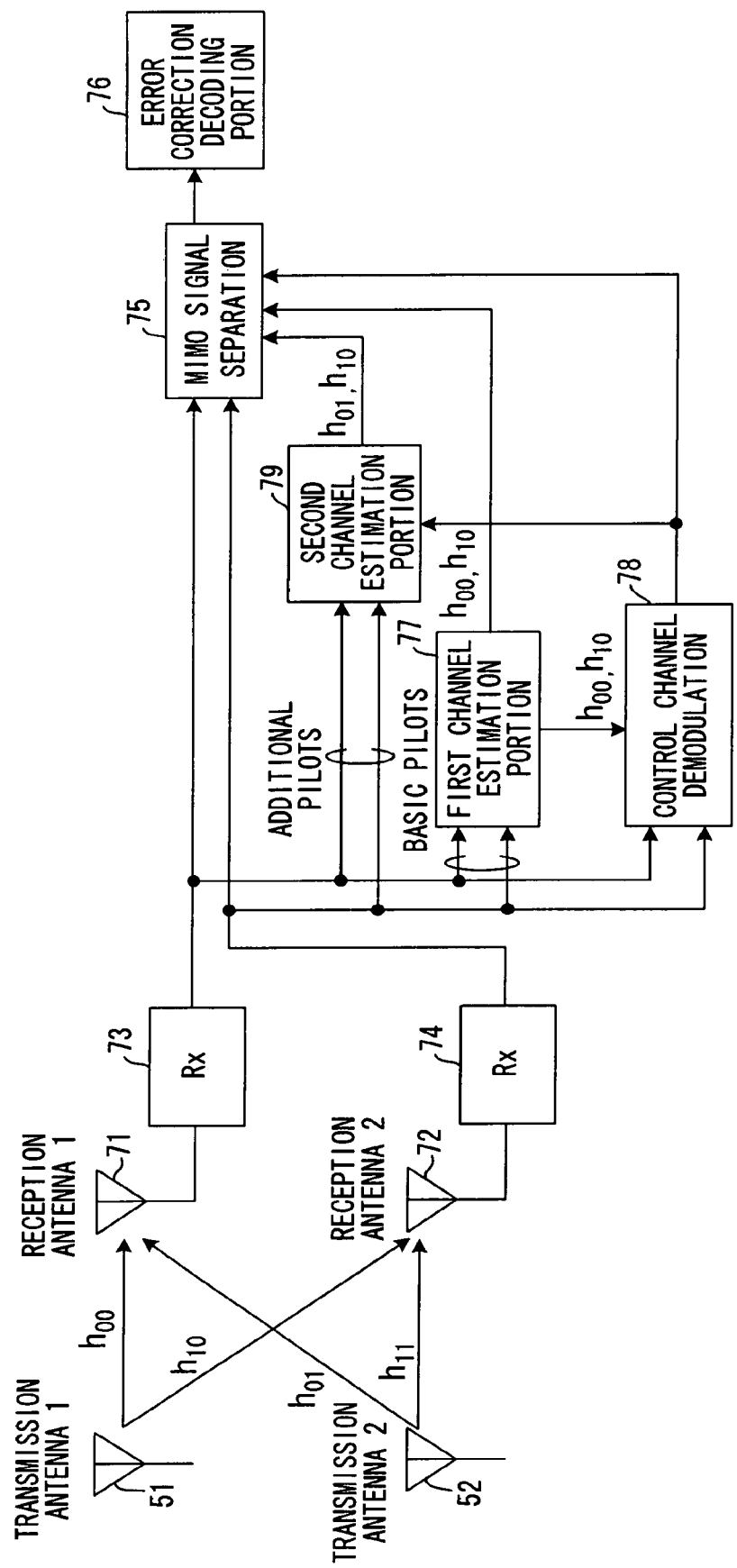
FIG. 17 shows the configuration of the reception device in the second embodiment.

FIG. 17 shows the configuration of the reception device in the second embodiment, configured to enable reception during transmission by a single transmission antenna and reception during MIMO multiplexed transmission.

The reception device uses two reception antennas 71, 72 during MIMO multiplexed transmission, and the independent data channels transmitted from the transmission antennas 51, 52 are separated and output; when MIMO multiplexed transmission is not performed, one reception antenna 71, or two reception antennas 71, 72 are used, and the data channel transmitted from the transmission antenna 51 is demodulated and output.

The reception portions 73, 74 down-convert the frequency of the radio signals received by the reception antennas 71, 72 to the baseband frequency, and then perform orthogonal demodulation of received frames.

If MIMO multiplexed transmission is not being performed, the first channel estimation portion 77 uses the basic pilot symbols included in each of the received frames output from the reception portions 73, 74 to estimate the propagation paths from the transmission antenna 51 to the reception antennas 71, 72, to obtain channel estimation values $h_{00}$, $h_{10}$. The control channel demodulation portion 78 uses the channel estimation values $h_{00}$, $h_{10}$ thus obtained to perform demodulation of the control channel of received frames input from the reception portions 73, 74, and inputs control symbol information (wireless link parameters, whether MIMO multiplexed transmission is being performed, and similar) to the MIMO signal separation portion 75.

When MIMO multiplexed transmission is not being performed, the MIMO signal separation portion 75 uses the above-described channel estimation values $h_{00}$, $h_{10}$ to demodulate data symbols in the data channel transmitted from the transmission antenna 51, and inputs the results to the error correction decoding portion 76.

If MIMO multiplexed transmission is being performed, the first channel estimation portion 77 uses basic pilot symbols included in each of the received frames output from the reception portions 73, 74 to estimate the propagation paths from the transmission antenna 51 to the reception antennas 71, 72, obtaining channel estimation values $h_{00}$, $h_{10}$. The control channel demodulation portion 78 uses the channel estimation values $h_{00}$, $h_{10}$ thus obtained to perform demodulation of the control channel of received frames input from the reception portions 73, 74, and from the control symbol information obtains information that MIMO multiplexed transmission is being performed as well as additional pilot symbols information, and instructs the second channel estimation portion 79 to use the additional pilot symbols to perform channel estimation. Further, the control channel demodulation portion 78 inputs control symbol information (wireless link parameters and additional pilot symbol positions, whether MIMO multiplexed transmission is being performed, and similar) to the MIMO signal separation portion 75.

The second channel estimation portion 79 estimates the propagation paths from the transmission antenna 52 to the reception antennas 71, 72 using the additional pilot symbols, according to the instruction from the control channel demodulation portion 78, and inputs the channel estimation values obtained $h_{01}$, $h_{11}$ to the MIMO signal separation portion 75. The MIMO signal separation portion 75 uses the above-described channel estimation values $h_{00}$, $h_{10}$, $h_{01}$, $h_{11}$ to perform well-known MIMO signal separation processing, separates and demodulates data symbols in the data channel transmitted from the transmission antennas 51, 52, and inputs the results to the error correction decoding portion 76.

According to the second embodiment, when transmitting from a plurality of transmission antennas, additional pilot symbols are inserted, so that channel estimation necessary for data symbol demodulation can be performed on the receiving side. Hence switching from transmission from a single transmission antenna to transmission from a plurality of transmission antennas, as in the case of MIMO multiplexed transmission, is possible in response to a request.

Also, according to the second embodiment, pilots can be added to estimate the propagation path for each transmission antenna, so that communication methods employing multiantenna transmission techniques can be flexibly accommodated. And, when not transmitting using multiple antennas, excess pilot symbols are not used, so that data transmission efficiency can be improved.

(D) Third Embodiment

Figure 18:
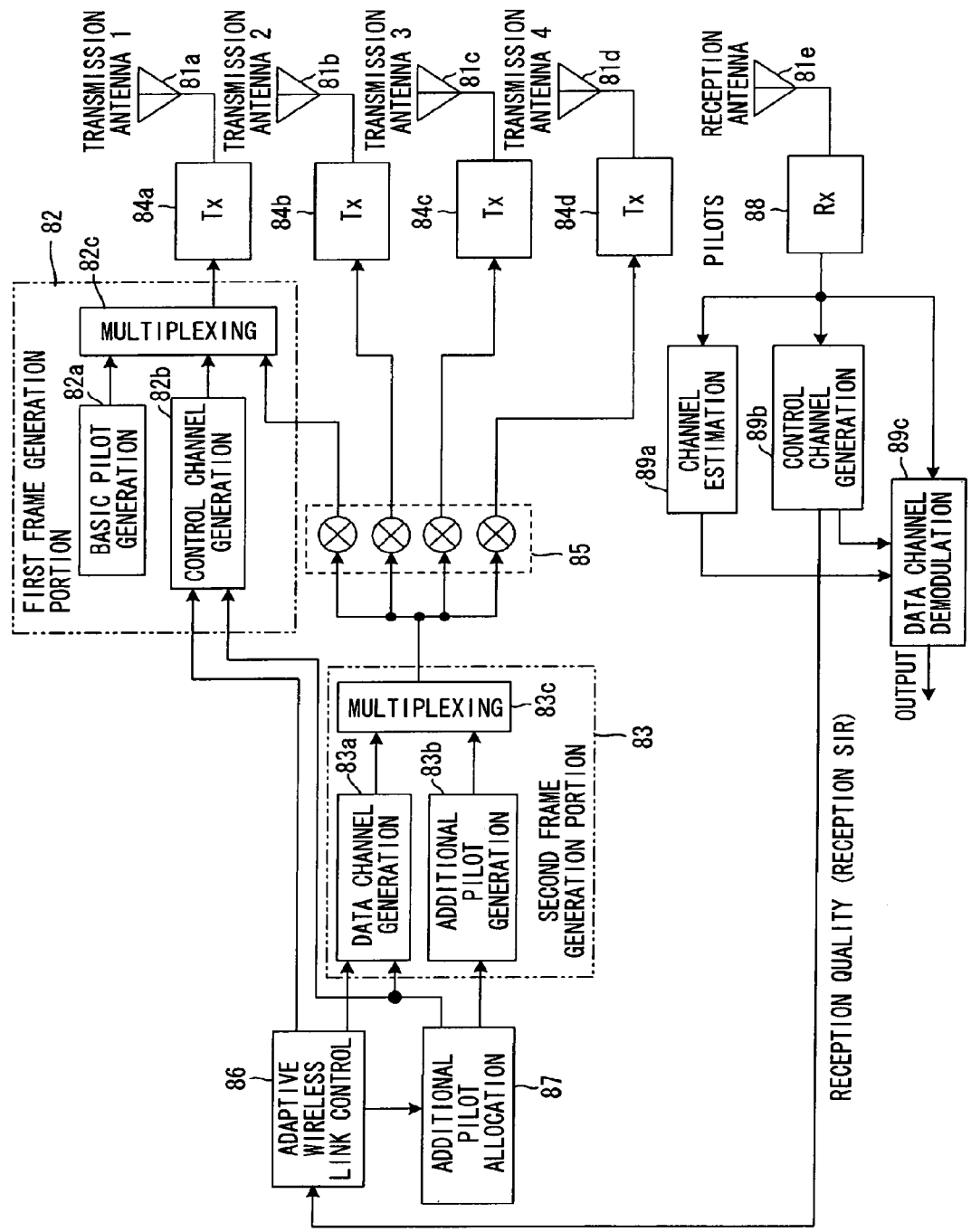
FIG. 18 shows the configuration of the transmission device in a third embodiment.

FIG. 18 shows the configuration of the transmission device of a third embodiment, capable of both transmission by only a single transmission antenna, and of transmission using a plurality of antennas for transmission-beam forming. The beam directionality of one antenna ANT1 is nondirectional, as indicated by BD1 in FIG. 19, and the gain is constant regardless of the direction from ANT1 to the mobile terminal MS. On the other hand, by means of an adaptive array antenna, the transmission beam can be provided with the directionality BD2 and transmission can be directed in a prescribed direction, so that compared with a case of nondirectional transmission by a single antenna, a higher gain can be obtained. Hence when the mobile terminal MS becomes distant from the antenna ANT1 and reception quality declines, through transmission-beam forming to perform transmission from a plurality of antennas with directionality, the reception quality can be improved.

The transmission device of FIG. 18 uses four transmission antennas 81*a* to 81*d* in transmission-beam forming; when not using transmission-beam forming, signals are transmitted only from the transmission antenna 81*a*.

The first frame generation portion 82 assembles frames comprising basic pilot symbols and control symbols to be transmitted from one transmission antenna 81*a*, and the second frame generation portion 83 assembles frames to be transmitted from the transmission antennas 81*a* to 81*d*, not comprising basic pilot symbols or control symbols.

That is, the first frame generation portion 82 comprises a basic pilot generation portion 82*a*, which generates basic pilot symbols; a control channel generation portion 82*b*, which generates control symbols; and a multiplexing portion 82*c*, which multiplexes and outputs these basic pilot symbols and control symbols with the data symbols output from the second frame generation portion 83.

The second frame generation portion 83 has a data channel generation portion 83*a*, which generates data symbols; an additional pilot generation portion 83*b*, which generates additional pilot symbols; and a multiplexing portion 83*c*, which multiplexes and outputs these symbols.

When transmitting from a single transmission antenna 81*a* without performing transmission-beam forming, the first frame generation portion 82 multiplexes basic pilot symbols, control symbols, and data symbols for the transmission antenna 81*a* output from the beam former 85, and generates and outputs frames such as in (A) of FIG. 20. The transmission portion 84*a* performs wireless signal processing of frames generated by the first frame generation portion 82 and second frame generation portion 83, and transmits the frames from antenna 81*a*.

When performing beam forming and transmission, the second frame generation portion 83 generates and outputs frames such as in (B) of FIG. 20. The beam former 85 adds weighting to frames input to each antenna such that the beam is directed in the direction of existence of the reception device. The first frame generation portion 82 multiplexes basic pilot symbols, control symbols, and the symbols for the transmission antenna 81*a* output from the beam former 85 (data symbols, additional pilot symbols), and generates and outputs frames such as in (C) of FIG. 20. The transmission portion 84*a* transmits frames generated by the first frame generation portion 82 from the antenna 81*a*, and the transmission portions 84*b* to 84*d* transmit frames output from the beam former 85 and with weighting from the respective antennas 81*b* to 81*d*.

The adaptive wireless link control portion 86 executes control to decide the data channel modulation method, coding rate, spreading factor, and other link parameters based on propagation path information sent from the reception device, or on propagation path information indicating the propagation path state measured by a propagation path state measurement portion (not shown) within the device itself, and at the same time inputs this information to the control channel generation portion 82*b* and data channel generation portion 83*a*. If link parameter modification is not possible, the adaptive wireless link control portion 86 notifies the additional pilot allocation portion 87 of switching from transmission by a single transmission antenna to beam forming transmission by a plurality of transmission antennas. By this means, the additional pilot allocation portion 87 instructs the additional pilot generation portion 83*b* to generate additional pilot symbols, and specifies the number of additional pilot symbols and the additional pilot symbol positions, and in addition inputs the additional pilot symbol positions to the data channel generation portion 83*a*, and notifies the control channel generation portion 82*b* of information relating to additional pilot symbols and of the fact that beam forming transmission is being performed. As a result, the second frame generation portion 83 generates frames such as shown in (B) of FIG. 20, the first frame generation portion 82 generates frames such as shown in (C) of FIG. 20, and the frames are transmitted from the transmission antennas 81*a* to 81*d*.

The reception portion 88 receives signals sent from the reception device via the antenna 81*e*, down-converts the frequency of the received radio signals to the baseband frequency, and then performs orthogonal demodulation and inputs the results to the channel estimation portion 89a, control channel demodulation portion 89b, and data channel demodulation portion 89c. The channel estimation portion 89a uses pilot signals to estimate the uplink channel from the reception device (mobile terminal), and the control channel demodulation portion 89b uses the channel estimation value to demodulate the control channel sent from the reception device, and notifies the adaptive wireless link control portion 86 of propagation path information, ACK/NACK information, and similar transmitted via the control channel. The data channel demodulation portion 89c uses the channel estimation value and control information which identifies the modulation method, coding rate, and other parameters to demodulate and output data symbols.

Figure 21:
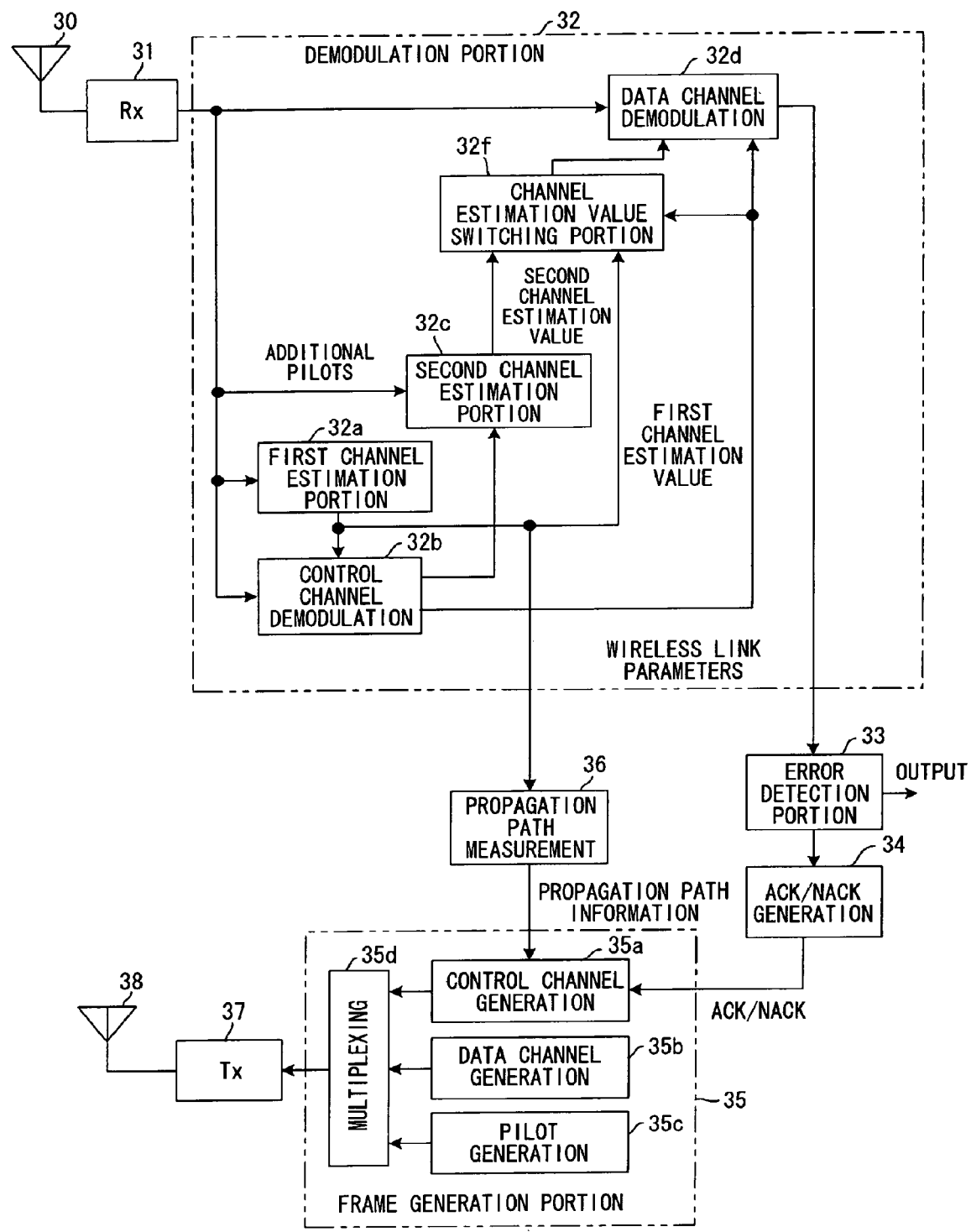
FIG. 21 shows the configuration of the reception device in the third embodiment.
Figure 22:
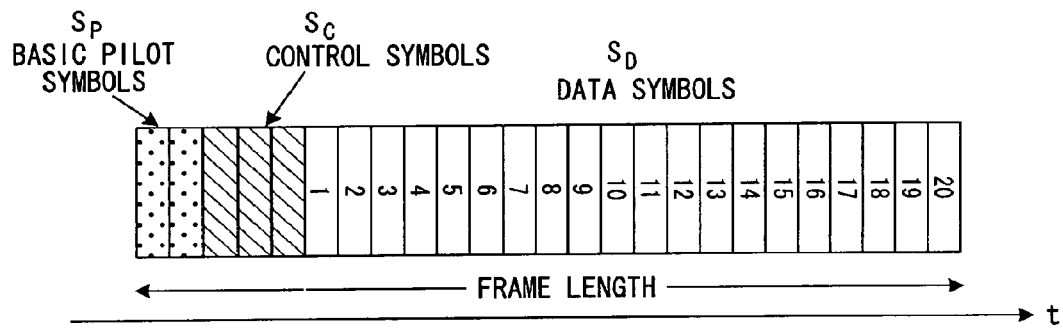
FIG. 22 shows the conventional frame configuration used in packet transmission for cellular mobile communication.
Figure 23:
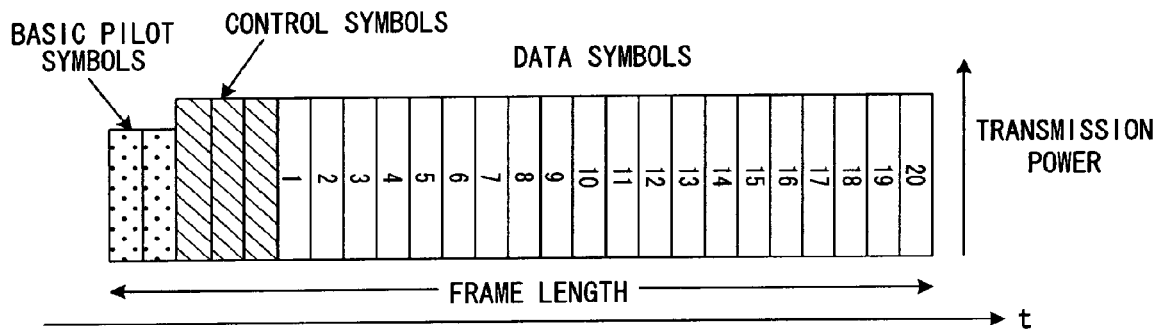
FIG. 23 is a first frame example in a case in which transmission power control is performed for users at a cell edge experiencing poor communication quality.
Figure 24:
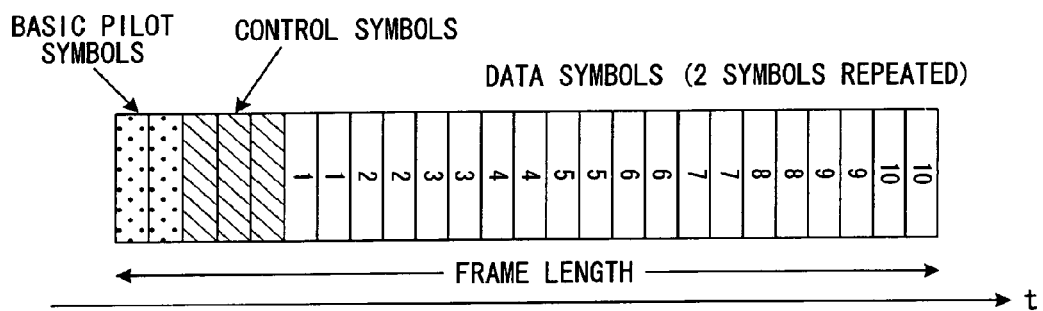
FIG. 24 is a second frame example in a case in which adaptive spreading factor control is performed for users at a cell edge experiencing poor communication quality.

FIG. 21 shows the configuration of the reception device in the third embodiment; portions which are the same as in the reception device of the first embodiment in FIG. 10 are assigned the same symbols. Differences include (1) the fact that a channel estimation value switching portion 32f is provided in the demodulation portion 32; (2) the fact that the first channel estimation portion 32a estimates the propagation path for transmission by a single transmission antenna and outputs a first channel estimation value, and the second channel estimation portion 32c estimates the propagation path for beam forming transmission and outputs a second channel estimation value; and (3) the fact that the channel estimation value switching portion 32f selects the first channel estimation value or the second channel estimation value, according to whether transmission is a single antenna transmission or is beam forming transmission, and inputs the selected value to the data channel demodulation portion 32d.

The first channel estimation portion 32a uses basic pilot symbols included in the received frames to perform channel estimation, and inputs the obtained first channel estimation values to the control channel demodulation portion 32b and channel estimation value switching portion 32f. The control channel demodulation portion 32b demodulates the control channel based on the first channel estimation value, determines whether the transmission is beam forming transmission, and if the transmission is beam forming transmission, confirms the number of additional pilot symbols and their positions, and instructs the second channel estimation portion 32c to execute channel estimation using the additional pilot symbols.

The control channel demodulation portion 32b inputs information indicating whether the transmission is beam forming transmission to the channel estimation value switching portion 32f, and notifies the data channel demodulation portion 32d of adaptive wireless link parameters and additional pilot symbol position information.

As a result of the instruction from the control channel demodulation portion 32b, the second channel estimation portion 32c performs channel estimation using the additional pilot symbols, and inputs the second channel estimation value thus obtained to the channel estimation value switching portion 32f.

The channel estimation value switching portion 32f selects one among the first channel estimation value and second channel estimation value according to whether the transmission is a single antenna transmission or beam forming transmission, and inputs the value to the data channel demodulation portion 32d. The data channel demodulation portion 32d performs data channel demodulation based on the input channel estimation value, wireless link parameters, additional pilot symbol positions, and similar.

By means of the above-described third embodiment, pilots can be added for use in estimating the propagation path of beam-formed signals, so that communication methods using beam forming transmission techniques can be flexibly accommodated. Moreover, when beam forming transmission is not performed, excess pilot symbols are not used, so that data transmission efficiency can be improved.

Thus by means of this invention, insertion of additional pilot symbols is performed adaptively based on the propagation path state, so that channel estimation precision can be improved.

By means of this invention, even when the motion velocity of the mobile station is fast and the fading frequency is high, by dispersing the positions of the additional pilot symbols, the channel estimation precision can be adaptively improved.

By means of this invention, when data errors are not alleviated by adaptive control which changes the transmission method based on the propagation path state, pilot symbols are added, so that the S/N of data symbol can be improved, and moreover the precision of channel estimation can simultaneously be improved through pilot addition.

By means of this invention, additional pilot symbols are inserted when transmitting from a plurality of transmission antennas, so that channel estimation necessary for demodulation of data symbols can be performed on the receiving side. Hence switching can be performed, based on the propagation path state or on request from the receiving side, from transmission by a single transmission antenna to transmission by a plurality of transmission antennas, such as in MIMO multiplexed transmission and in transmission-beam forming. That is, by means of this invention, pilots can be added to estimate the propagation paths of signals for each transmission antenna and the propagation paths of signals transmitted by beam forming, so that communication methods employing multi-antenna transmission techniques can be flexibly accommodated. Further, when transmission employing multiple antennas is not performed, excess pilot symbols are not used, so that data transmission efficiency can be improved.

By means of this invention, the control channel is used to convey the presence or absence of additional pilot symbols, the number of such symbols, the added positions, and other information, so that on the receiving side the presence or absence of additional pilot symbols, the number of symbols, and the positions of addition can be recognized, and the additional pilot symbols can be used in channel estimation.

By means of this invention, in addition to adaptive wireless link control of the data channel, additional pilot symbol addition control is performed, so that not only the S/N of the data channel, but the precision of channel estimation can also be improved simultaneously, and system throughput can be enhanced.

By means of this invention, the additional pilot symbol power and number of symbols can be set to small values in advance, so that pilot symbol insertion losses can be kept low. By this means, throughput at cell edges can be improved, and interference in other cells can be reduced.

By means of this invention, by detecting errors in additional pilot information included in the control channel, even when transmission errors occur in the control channel other than the additional pilot information, the result of channel estimation using additional pilot symbols can be employed to again execute control symbol decoding, so that control channel transmission errors can be alleviated.

What is claimed is:

1. A wireless communication system for transmitting and receiving frames comprising basic pilot symbols used commonly for one or more reception devices which communicate with a transmission device, in propagation path estimation, control symbols conveying control information used for data channel demodulation, and data symbols conveying information bits, wherein the transmission device comprises:
a pilot addition decision portion for deciding whether to add pilot symbols and a position of additional pilot symbols, which are separate from the basic pilot symbols, to frames;
a control symbol generation portion for generating control symbols comprising information indicating whether the additional pilot symbols are present and the position of the additional pilot symbols;
a frame assembly portion for assembling frames to which said pilot symbols are added according to said pilot addition decision; and
a transmission portion for transmitting the frames;
and the reception device comprises:
a control symbol demodulation portion for demodulating control symbols included in the received frames, and judges whether the additional pilot symbols symbols are included in the received frames based on the control symbol information; and
a data symbol demodulation portion for demodulating data symbols based on a propagation path estimation value which is estimated using the additional pilot symbols or using the additional pilot symbols and the basic pilot symbols when the additional pilot symbols are included in the received frame.

2. The wireless communication system according to claim 1, wherein said transmission device comprises a propagation path information output portion, which acquires and outputs propagation path information relating to a state of the propagation path between the reception device and the transmission device, and said pilot addition decision portion decides on whether it is necessary to add said pilot symbols, and on a number of additional pilot symbols based on the propagation path information.

3. The wireless communication system according to claim 1, wherein said transmission device comprises a motion velocity acquisition portion which acquires the motion velocity of the reception device, and said pilot addition decision portion decides whether to arrange the additional pilot symbols in dispersed positions in a data symbol area and positions of the additional pilot symbols, according to the motion velocity of the reception device.

4. The wireless communication system according to claim 1, wherein said transmission device further comprises:
a propagation path information output portion which acquires and outputs propagation path information relating to a state of the propagation path between the reception device and the transmission device, and
an adaptive control portion which adaptively controls a transmission method based on said propagation path information, wherein
said pilot addition decision portion decides to add pilot symbols when transmission errors are not improved by the adaptive control.

5. The wireless communication system according to claim 1, wherein said transmission device comprises:
a plurality of transmission antennas, and
a transmission portion corresponding to the respective transmission antennas, wherein
said frame assembly portion assembles frames comprising the basic pilot symbols and the control symbols but not comprising the additional pilot symbols when transmitting from one transmission antenna, and assembles said frames for transmission from said one transmission antenna and frames for transmission from other transmission antennas, comprising the additional pilot symbols but comprising neither basic pilot symbols nor control symbols when transmitting from the plurality of antennas.

6. The wireless communication system according to claim 5, wherein said reception device comprises:
a plurality of reception antennas;
a reception portion corresponding to the respective reception antennas; and
a propagation path estimation portion for estimating the propagation paths from said one transmission antenna to each reception antenna using the basic pilot symbols and estimating the propagation paths from said other transmission antennas to each reception antenna using said additional pilot symbols, wherein
the data symbol demodulation portion demodulates data symbols transmitted from each transmission antenna using a propagation path estimation value for each of said propagation paths.

7. The wireless communication system according to claim 1, wherein said transmission device comprises:
a plurality of transmission antennas;
a transmission portion corresponding to the respective transmission antennas;
a second frame assembly portion which, when pilot symbols are added, assembles frames comprising the additional pilot symbols and data symbols, but comprising neither basic pilot symbols nor control symbols;
a beam former, which performs beam forming processing on the frames assembled by said second frame assembly portion and inputs results to the respective transmission antennas; and
a first frame assembly portion, which assembles frames comprising basic pilot symbols, control symbols, and data symbols input from said beam former and inputs the frames to one transmission antenna, and wherein
when beam forming is not performed, said second frame assembly portion assembles frames without adding pilot symbols and inputs the frames to said one transmission antenna, and when beam forming is performed, said second frame assembly portion assembles frames with pilot symbols added and inputs signals processed by said beam former to said plurality of transmission antennas.

8. The wireless communication system according to claim 7, wherein in a case where pilot symbols are not added, said first frame assembly portion assembles frames comprising basic pilot symbols, control symbols and data symbols and inputs the frames to said one transmission antenna, and in a case where pilot symbols are added, the first frame assembly portion assembles frames comprising basic pilot symbols, control symbols, and additional pilot symbols and data symbols weighted by said beam former and inputs the frames to said one transmission antenna.

9. The wireless communication system according to claim 7, wherein said reception device comprises:
a plurality of reception antennas;
a reception portion corresponding to said respective reception antennas; and
a propagation path estimation portion for estimating the propagation path for transmission by said one transmission antenna using said basic pilot symbols and estimating the propagation paths for beam forming transmission using said additional pilot symbols, wherein
said control symbol demodulation portion judges whether beam forming transmission is being performed, and said data symbol demodulation portion demodulates data symbols using a prescribed estimation value for said propagation path, according to whether beam forming transmission is being performed.

10. The wireless communication system according to claim 1, wherein said reception device comprises:
a first propagation path estimation portion which estimates the propagation path using said basic pilot symbols, and
a second propagation path estimation portion which, if the additional pilot symbols exist, estimates the propagation path using the additional pilot symbols, and wherein
said control symbol demodulation portion as a first control symbol demodulation portion, demodulates control symbols using a first propagation path estimation value estimated by said first propagation path estimation portion, and said data symbol demodulation portion, when said additional pilot symbols exist, demodulates data symbols using said control symbol information and a second propagation path estimation value estimated by said second propagation path estimation portion, and said data symbol demodulation portion, when said additional pilot symbols do not exist, demodulates data symbols using said control symbol information and a first propagation path estimation value estimated by said first propagation path estimation portion.

11. The wireless communication system according to claim 10, wherein said reception device comprises:
an error detection portion which detects errors in the additional pilot symbol information included in said control symbols; and
a second control symbol demodulation portion which, if no transmission errors have occurred in the additional pilot symbol information, demodulates control symbols again based on said second propagation path estimation value, and wherein
said data symbol demodulation portion, when no transmission errors have occurred in the additional pilot symbol information, demodulates data symbols using the control symbols demodulated by said second control symbol demodulation portion and said second propagation path estimation value and said data symbol demodulation portion, when transmission errors have occurred in the additional pilot symbol information, demodulates data symbols using the control symbols demodulated by said first control symbol demodulation portion and said first propagation path estimation value.

12. A transmission device, in a wireless communication system for transmitting and receiving frames comprising basic pilot symbols used commonly for one or more reception devices which communicate with the transmission device, in propagation path estimation, control symbols conveying control information used for data channel demodulation, and data symbols conveying information bits, wherein comprising:
a pilot addition decision portion for deciding whether to add pilot symbols and a position of additional pilot symbols, which are separate from the basic pilot symbols, to frames;
a control symbol generation portion for generating control symbols comprising information indicating whether the additional pilot symbols are present and the position of the additional pilot symbols;
a frame assembly portion assembling frames to which the pilot symbols are added according to said pilot symbol addition decision; and
a transmission portion transmitting the frames to a reception device.

13. The transmission device according to claim 12, further comprising a propagation path information output portion which acquires and outputs propagation path information relating to a state of the propagation path between the reception device and the transmission device, wherein said pilot addition decision portion decides on whether said pilot symbols are to be added, and on a number of additional pilot symbols, based on the propagation path information.

14. The transmission device according to claim 13, further comprising a motion velocity acquisition portion which acquires the motion velocity of the reception device, wherein said pilot addition decision portion decides whether to arrange the additional pilot symbols in dispersed positions in a data symbol area and positions of the additional pilot symbols, according to the motion velocity of the reception device.

15. The transmission device according to claim 12, further comprising:
a propagation path information output portion which acquires and outputs propagation path information relating to a state of the propagation path between the reception device and the transmission device, and
an adaptive control portion which adaptively controls a transmission method based on said propagation path information, wherein
said pilot addition decision portion decides to add pilot symbols when transmission errors are not improved by the adaptive control.

16. The transmission device according to claim 12, further comprising:
a plurality of transmission antennas, and
a transmission portion corresponding to the respective transmission antennas, wherein
said frame assembly portion assembles frames comprising basic pilot symbols and control symbols but not comprising the additional pilot symbols when transmitting from one transmission antenna, and assembles said frames for transmission from said one transmission antenna and frames for transmission from other transmission antennas, comprising the additional pilot symbols but comprising neither basic pilot symbols nor control symbols when transmitting from the plurality of antennas.

17. The transmission device according to claim 12, further comprising:
a plurality of transmission antennas;
a transmission portion corresponding to the respective transmission antennas;
a second frame assembly portion which, when pilot symbols are added, assembles frames comprising the additional pilot symbols and data symbols, but comprising neither basic pilot symbols nor control symbols;
a beam former, which performs beam forming processing on frames assembled by said second frame assembly portion and inputs results to the respective transmission antennas; and
a first frame assembly portion, which assembles frames comprising basic pilot symbols, control symbols, and data symbols input from said beam former, and inputs the frames to one transmission antenna, wherein
when beam forming is not performed, said second frame assembly portion assembles frames without adding pilot symbols and transmits the frames from said one transmission antenna, and when beam forming is performed, said second frame assembly portion assembles frames with pilot symbols added, and transmits signals processed by said beam former from said plurality of transmission antennas.

18. A reception device, in a wireless communication system for transmitting and receiving frames comprising basic pilot symbols used in propagation path estimation, control symbols conveying control information necessary for data channel demodulation, and data symbols conveying information bits, comprising:
- a reception portion receiving frames transmitted from a transmission device;
- a first propagation path estimation portion which estimates the propagation path using the basic pilot symbols in said received frames and outputs a first propagation path estimation value;
- a first control symbol demodulation portion which demodulates control symbols comprising information indicating whether additional pilot symbols are present and a position of the additional pilot symbols, by using the propagation path estimation value, and judges from the control symbol information whether the additional pilot symbols are added to the received frames and the position of the additional pilot symbols;
- a second propagation path estimation portion which, when the additional pilot symbols are added, estimates the propagation path using the additional pilot symbols and outputs a second propagation path estimation value; and
- a data symbol demodulation portion which, when the additional pilot symbols are not added to frames, demodulates data symbols using said first propagation path estimation value, but when the additional pilot symbols are added, demodulates data symbols using said second propagation path estimation value.

19. The reception device according to claim 18, further comprising:
- an error detection portion, which detects errors in the additional pilot symbol information included in said control symbols; and
- a second control symbol demodulation portion which, if no transmission errors have occurred in the additional pilot symbol information, demodulates control symbols again based on said second propagation path estimation value, wherein
- said data symbol demodulation portion, when no transmission errors have occurred in the additional pilot symbol information, demodulates data symbols using control symbols demodulated by said second control symbol demodulation portion and said second propagation path estimation value and said data symbol demodulation portion, when transmission errors have occurred in the additional pilot symbol information, demodulates data symbols using control symbols demodulated by said first control symbol demodulation portion and said first propagation path estimation value.

20. A wireless communication method for transmitting and receiving frames comprising basic pilot symbols used commonly for one or more receiving sides which communicate with a transmitting side, in propagation path estimation, control symbols conveying control information used for data channel demodulation, and data symbols conveying information bits, comprising, on the transmitting side:
- deciding whether to add pilot symbols and a position of additional pilot symbols which are separate from the basic pilot symbols, to frames;
- generating control symbols comprising information indicating whether the additional pilot symbols are present and the position of the additional pilot symbols; and
- assembling and transmitting frames comprising said basic pilot symbols, control symbols, additional pilot symbols, and data symbols;

and comprising, on the one or more receiving sides;
- demodulating control symbols included in the received frames;
- judging whether the received frames comprise the additional pilot symbols based on the control symbol information;
- when the additional pilot symbols are included, estimating the propagation path using the additional pilot symbols or using the additional pilot symbols and the basic pilot symbols; and
- demodulating data symbols using the propagation path estimation value.

21. The wireless communication method according to claim 20, wherein the deciding includes:
- acquiring propagation path information and
- deciding on whether said pilot symbols are to be added, and on a number of additional pilot symbols, based on the propagation path information.

22. The wireless communication method according to claim 20, wherein the deciding includes:
- acquiring motion velocity of the one or more receiving sides, and
- deciding whether to arrange the additional pilot symbols in dispersed positions in a data symbol area and positions of the additional pilot symbols according to the motion velocity of the one or more receiving sides.

23. The wireless communication method according to claim 20, wherein, the method further comprises:
- acquiring and outputting propagation path information relating to a state of the propagation path between the one or more receiving sides and the transmitting side, and
- adaptively controlling a transmission method based on said propagation path information, wherein
- in said deciding, when transmission errors are not improved even by the adaptive control, a decision is made to add pilot symbols.

24. A reception device, in a wireless communication system for transmitting and receiving frames comprising basic pilot symbols used commonly for one or more reception devices which communicate with a transmission device, in propagation path estimation, control symbols conveying control information used for data channel demodulation, and data symbols conveying information bits, comprising,
- a reception portion receiving frames transmitted from the transmission device;
- a control symbol demodulation portion which demodulates control symbols comprising information indicating whether additional pilot symbols are present and a position of the additional pilot symbols, included in the received frames and judges based on the control symbol information whether the additional pilot symbols are included in the received frames and the position of the additional pilot symbols wherein the additional pilot symbols being added to frames separately from the basic pilot symbols, in the transmission device; and
- a data symbol demodulation portion for demodulating data symbols based on a propagation path estimation value which is estimated using the additional pilot symbols or using the additional pilot symbols and basic pilot symbols when the additional pilot symbols are included in the received frame.

* * * * *